(12) United States Patent
Lawther et al.

(10) Patent No.: US 7,882,442 B2
(45) Date of Patent: Feb. 1, 2011

(54) MULTI-FRAME DISPLAY SYSTEM WITH PERSPECTIVE BASED IMAGE ARRANGEMENT

(75) Inventors: Joel S. Lawther, East Rochester, NY (US); Dale F. McIntyre, Honeoye Falls, NY (US); Joseph A. Manico, Rochester, NY (US); Michael J. Telek, Pittsford, NY (US); John R. Fredlund, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 1046 days.

(21) Appl. No.: 11/649,972

(22) Filed: Jan. 5, 2007

(65) Prior Publication Data

US 2008/0165081 A1 Jul. 10, 2008

(51) Int. Cl.
*G06F 13/00* (2006.01)
*G06F 15/00* (2006.01)

(52) U.S. Cl. ..................... 715/748; 715/738
(58) Field of Classification Search ............... 715/748, 715/738, 717, 730, 752, 866, 744, 810, 205, 715/762–765
See application file for complete search history.

(56) References Cited

U.S. PATENT DOCUMENTS

| | | |
|---|---|---|
| 4,608,770 A | 9/1986 | Gray |
| 5,455,754 A | 10/1995 | Hoffner |
| 5,537,289 A | 7/1996 | Dahl |
| 5,588,240 A | 12/1996 | Zilliox |
| D380,905 S | 7/1997 | Key et al. |
| 5,652,880 A | 7/1997 | Seagraves |
| 5,838,906 A * | 11/1998 | Doyle et al. ............... 715/205 |
| 5,905,492 A * | 5/1999 | Straub et al. ............... 715/744 |
| 6,509,910 B1 | 1/2003 | Agarwal et al. |
| 6,535,228 B1 | 3/2003 | Bandaru et al. |
| 6,570,546 B1 | 5/2003 | Welker et al. |
| 6,636,648 B2 | 10/2003 | Loui et al. |
| 6,670,934 B1 * | 12/2003 | Muoio et al. ............... 345/1.1 |
| 6,748,097 B1 | 6/2004 | Gindele et al. |
| 6,931,070 B2 | 8/2005 | Moore |
| 7,035,467 B2 | 4/2006 | Nicponski |
| 7,091,926 B2 | 8/2006 | Kulas |
| 7,092,966 B2 | 8/2006 | McIntyre |
| 7,107,605 B2 | 9/2006 | Janik |
| 7,155,679 B2 * | 12/2006 | Bandaru et al. ............. 715/748 |
| 2004/0163105 A1 | 8/2004 | Thursfield |
| 2005/0111737 A1 | 5/2005 | Das et al. |

* cited by examiner

*Primary Examiner*—Cao "Kevin" Nguyen
(74) *Attorney, Agent, or Firm*—Roland R. Schindler; Raymond L. Owens

(57) ABSTRACT

Systems and methods are provided for presenting digital images using a plurality of digital media frames separated spatially along at least two axes. In one aspect the method comprises the steps of obtaining the digital images to be presented determining the multi-dimensional relationship between the digital media frames analyzing the digital images and any associated metadata to assign an image perspective determination to each of the digital images and determining an arrangement of the digital images for presentation on the plurality of the digital media frames according to the multi-dimensional relationship between the digital media frames and according to the determined image perspectives.

6 Claims, 29 Drawing Sheets

MULTI-FRAME DISPLAY SYSTEM WITH PERSPECTIVE BASED IMAGE ARRANGEMENT

CROSS REFERENCE TO RELATED APPLICATIONS

This application is related to U.S. Ser. No. 11/650,281, entitled FUNCTION ENHANCING ARRAY FOR MULTI-FRAME DISPLAY SYSTEM, in the names of Manico et al.; and U.S. Ser. No. 11/650,396, entitled MULTI-FRAME DISPLAY SYSTEM WITH SEMANTIC IMAGE ARRANGEMENT, in the names of Telek et al. all filed concurrently herewith.

FIELD OF THE INVENTION

This invention relates to display systems and methods for controlling display systems that use more than one pixilated display to display digital images to a presentation area.

BACKGROUND OF THE INVENTION

With the usage of liquid crystal, organic light emitting diode, plasma, and the like type display screens in consumer electronic devices such as personal media players, digital photo frames, computers, cell phones, digital projectors, and TVs the flat screen television industry, the computing industry and digital camera industries have grown to a tremendous size. With millions of displays manufactured, consumers have enjoyed a substantial drop in the cost of display devices. With inexpensive display devices, clusters of these displays can be created on a wall for a wide range of purposes including but not limited to displaying personal digital pictures and video clips. These clusters can be created to be in several kinds of patterns and of differing screen sizes. The goal of many is to tile these displays in a manner that allows a single image to be presented across the displays in a relatively continuous manner.

For example, it is known to link together displays for computer monitors with two and three displays linked together and connected to a single computer for use in providing increased workspace of computer aided design and spreadsheet type applications. It is also known to link together displays to provide gaming experiences such as immersive environments. For example, in U.S. Pat. No. 7,091,926 what is suggested is to create a three dimensional immersive environment using a plurality of flat displays arranged in a concave like shape around a field of view of a user. However, here too, the general objective is to provide a display experience that is essentially the equivalent of single presented image, although provided in a manner that is intended to simulate the field of view of a person.

U.S. Pat. No. 6,570,546 describes separate displays that visually see adjacent displays via optical or electrical sensors. Yet there is no means for feed back provided to the user for each of the display locations or ability to move images from display to display.

Furthermore, multiple picture frames in various rooms of a house or multiple houses have been suggested in U.S. Pat. Nos. 7,107,605 and 6,355,228, but there is no way to interact as a user from frame to frame or manage a wall of images from any of the single frames. Thus, what is needed is a system for managing the visual content in a cluster of digital media frames in a visual field by semantic type and in an interactive way.

In addition managing multimedia content across multiple displays and display types presents new problems to the user. Multiple digital displays can be arranged in an esthetically arranged grouping can present ever changing content which can be refreshed every few seconds. These groupings of digital photo frames can be placed within the same field of view or relative locations such as affixed to a wall or placed on a mantle provide a special case in that multiple frames may be presented in an array, matrix, of decorative pattern. This practice is analogous to how framed paper photographs are presented, often in grouping that have some thematic linkage such as, photos of grandchildren, a vacation, flowers, etc.

Unlike "fixed pattern" prior art systems, the devices of the invention can be of any number and can be located in any free form pattern or position desired by the user. Since digital picture frames can receive multimedia content wirelessly, the user can modify their positions and location at any time. It is desirable for esthetic, context, and story-telling applications to present the content in a sequence, form or format that takes advantage of the consumer selected pattern of digital picture frames.

Examples include; 3 digital photo frames are placed in close proximity to one another and arrayed in a single row, a panoramic digital image could be presented across the individual frames, without user intervention. Also since the relative locations, formats such as HDTV 16/9 or TV 4/3, and resolutions are known, the panoramic image can be split properly between the frames and can be loaded in such a way as to appear to sweep across all three frames. Another example; 9 digital photo frames are affixed to a wall in relative 3 by 3 matrix and the user designates to the system that the array is to be used to present pictures and videos of her "9 grandchildren" and each individual frame is designated for a particular grandchild. As the system receives semantically tagged content, such as an image with a metadata tag of the grandchild's name, the system would automatically place the appropriate grandchild tagged media on the appropriate digital photo frame of the array of grandchildren designated digital photo frames.

Furthermore digital "transitions" used in movies and digital slide shows are designed to be viewed on a single display and indicate transitions from one digital multimedia content element to the next. They can include an almost unlimited variety of digital effects that "temporally blend" the two sequential content elements so that the first content element disappears and the second content element appears. Any directional aspect of the transition is limited to the single frame or single presentation device in which the content is being viewed. With multiple presentations devices with known relative locations there is the opportunity to use transition effects to "spatially blend" content across multiple presentation devices. This provides a more esthetic viewing experience and would provide a user with an indication as to where to focus her attention when viewing multiple display devices.

SUMMARY OF THE INVENTION

Systems and methods are provided for presenting digital images using a plurality of digital media frames separated spatially along at least two axes. In one aspect the method comprises the steps of obtaining the digital images to be presented determining the multi-dimensional relationship between the digital media frames analyzing the digital images and any associated metadata to assign an image perspective determination to each of the digital images and determining an arrangement of the digital images for presentation on the plurality of the digital media frames according to the multi-dimensional relationship between the digital media frames and according to the determined image perspectives.

DETAILED DESCRIPTION OF THE INVENTION

Methods and systems for using a plurality of digital media frames to display digital images are provided. The terms digital image and digital images are used broadly herein to refer to any form of data that can be used by a digital media frame as a basis for presenting a visually perceptible output. Such digital image(s) can include, but are not limited to, any form of still image, sequence of still images, stream of image information, video images, text, or graphic information or representations. Digital images can be encoded in the form of digital image data that can include still image data, video data, text data, graphic data and data representing graphical representations, raster data, mathematical formulations, data structures and/or any combination thereof. The methods and systems described and claimed herein can enable a plurality of separate digital media frames to be used to present digital images in an efficient and intuitively understandable fashion without resort to the conventional expedient of virtually combining a plurality of separate displays so that they appear to work as a single generally continuous display device.

The following sections describe the general structure, operation and use of individual digital media frames and then describes methods and systems for operating a plurality of such digital media frames.

Digital Media Frame

A digital media frame (DMF) has a display unit and control system that allows a user to display at least one digital image with minimal user intervention. The DMF is capable of receiving digital images from various external input devices, such as, digital cameras, video cameras, computers, telephone lines, television cables, and Internet servers or other types of networks and in certain embodiments the DMF optionally can be made to capture digital images. Upon obtaining digital images, the DMF can generate auxiliary information relating to each digital image and stores the digital images together with the auxiliary information in a memory. The DMF, subsequently retrieves the digital images from the memory with the auxiliary information and displays the digital images on a display.

Figure 1:
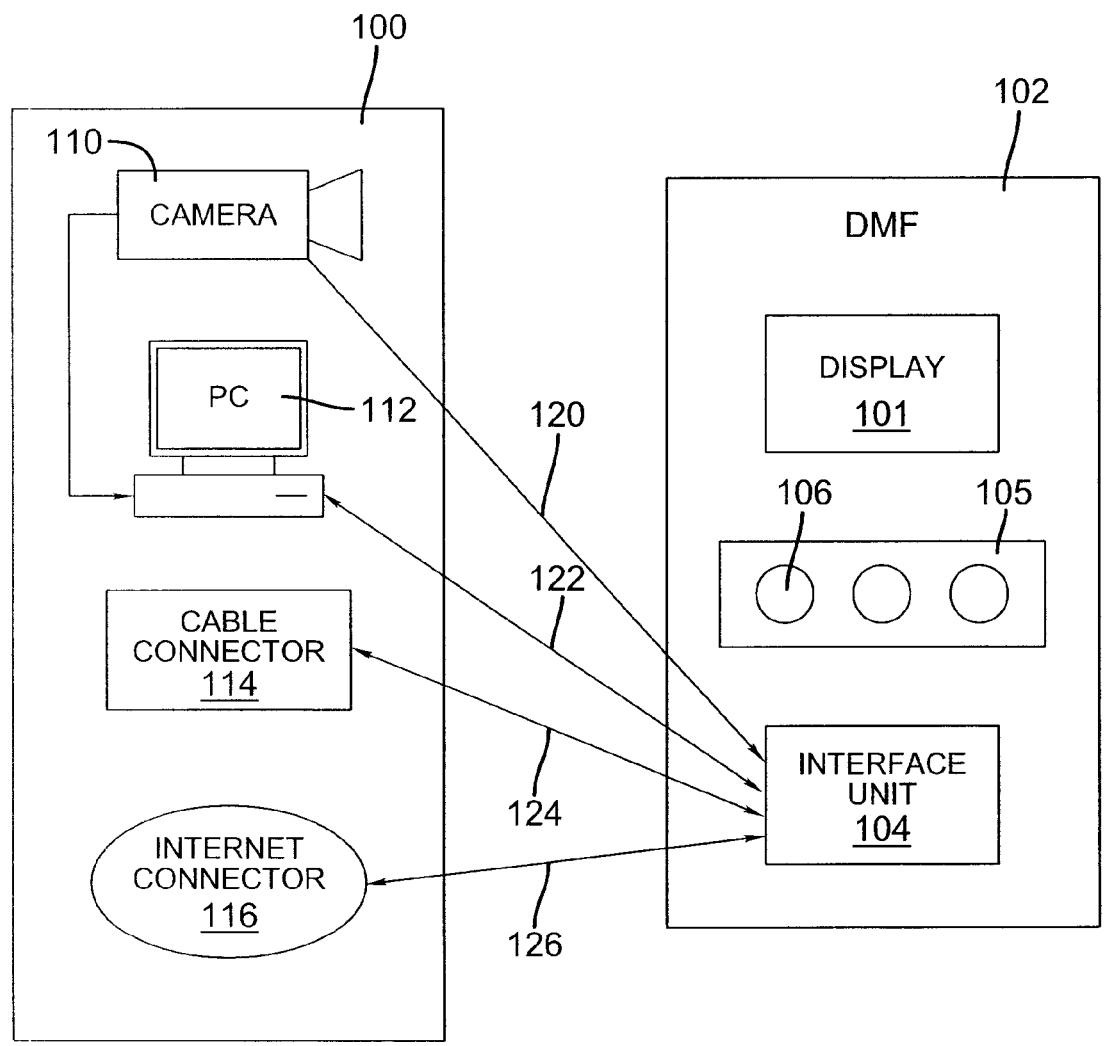
FIG. 1 illustrates a connection between Digital Media Frame ("DMF") and external input devices.

FIG. 1 illustrates an embodiment of a connection between external devices 100 and a DMF 102. In FIG. 1, DMF 102 is illustrated as being connected to a camera 110, a personal computer ("PC") 112, a cable connector 114, and an Internet connector 116.

DMF 102 further contains an interface unit 104 and a user input component 105. The user input component 105 also contains user-input buttons 106, which are the input devices. The interface unit 104 includes at least one I/O ("input and output") port capable of connecting to the camera 110, PC 112, the cable connectors 114, and the Internet connector 116 using connecting cables 120, 122, 124, and 126, respectively. The interface unit 104 is further capable of receiving and processing both digital and analog image data. It will be apparent to one of ordinary skill in the art that one or more of these external devices 100 can be connected to a particular DMF 102. It will also be apparent that the equivalent conventional input devices 100 can be similarly connected.

A camera 110 can be connected to interface unit 104. Camera 110 can be a digital still camera or a digital video camera that provides captured images in digital form. Camera 110 can also be an analog video camera that provides analog image signals that can be converted by interface unit 104 or other portions of DMF 102 into a digital image. In one embodiment, the camera 110 can directly transfer the captured image to the DMF using conventional transmission media, such as, for example, wireless, cable, or removable media. In another embodiment, the camera 110 can first transfer the captured images to a computer 112 and the computer 112, subsequently, transfers the digital images to the DMP 102. The advantage of using a computer 112 as a forwarding station between the camera 110 and the DMF 102 is to perform some functions where the DMF 102 is not particularly well suited to perform which can include some types of data conversions.

The computer 112, which may be a PC, a workstation, a mini-computer, or a mainframe computer, or a processor based system, receives digital or analog images from other devices, such as, scanners, Internet servers, or cameras 110. Upon receipt of the images, the computer 112 may perform some functions before the computer 112 passes the images to the DMF 102. The function may involve reordering the sequence of the images to be displayed, or converting one type of image to another type of digital image such as converting an1 analog image to a digital image, and so on.

The cable connectors 114 include television and telephone lines. The lines could be optical, metal, or cordless media. In one embodiment, the interface unit 104 is capable of receiving the digital images directly from the cable connectors 114. In another embodiment, the interface unit 104 receives the digital images from a forwarding station, such as a computer 112, where the cable connectors 114 are connected to the computer 112.

The Internet connector 116 is another external device 100 that enables the DMF 102 to receive digital images directly from an Internet node. In one embodiment, the DMF 102 is configured to be able to read ("HyperText Markup Language") HTML and to interface with Transmission Control Protocol ("TCP")/Internet protocol ("IP"). It should be noted that the connecting cables, 120, 122, 124, and 126 can use conventional optical, electrical, or wireless data communication technology.

Figure 2:
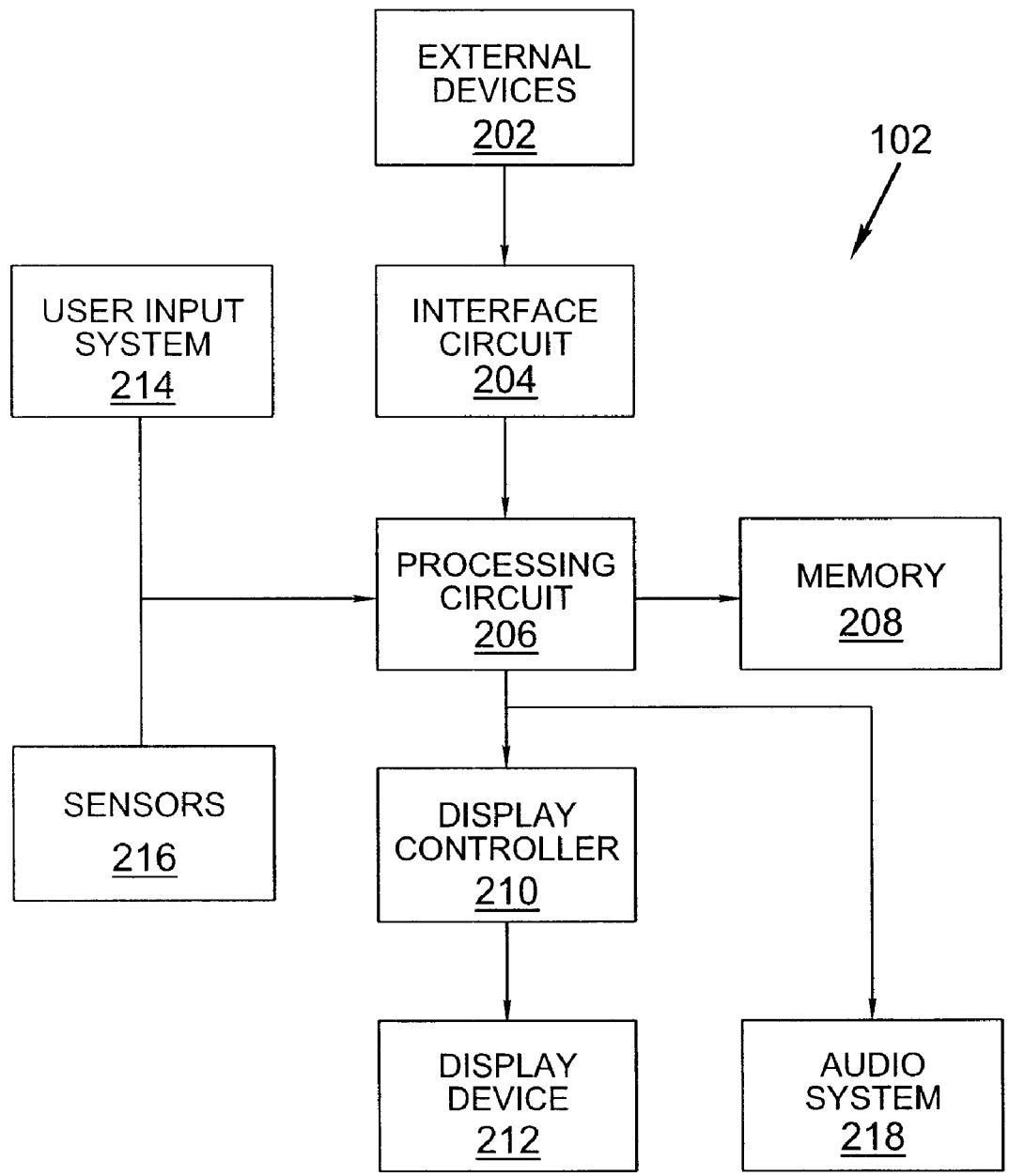
FIG. 2 illustrates a block diagram of one embodiment of a DMF.

FIG. 2 illustrates a block diagram of one embodiment of a digital media frame 200. In the illustrated embodiment, digital media frame 120 has an interface circuit 204, a processing circuit 206, memory 208, a display controller 210 and a display device 212, a user input system 214 and optional sensors 216.

Interface circuit 204 enables digital media frame 20 to receive input data from external devices 202 and can optionally be used to send data to external devices 202. External devices 202 can comprise but are not limited to digital still cameras, digital video cameras, scanners, computers, local servers, remote servers, memory devices, the internet, printers, internet appliances, a remote control (as will be described in greater detail below), personal digital assistants, personal video players, telephones, telecommunication networks, cellular telephones, analog televisions or digital televisions or television signal distribution systems such as cable, satellite or other television systems and/or television storage systems such as recorders or players of television systems such as solid state, optical, or magnetic television signal recording and/or playback systems. As will be discussed in greater detail below, interface unit 204 can also be adapted to communicate with one or more other types of external devices including other DMFs and/or a remote control.

Interface circuit 204 can take many known forms. Where interface circuit 204 is connected to an external device 202 that provides data signals that are already in proper form for use by DMF 102, interface circuit 204 can simply provide appropriate structures to receive and make use of the properly formatted digital data. Interface circuit 204 can also be adapted to enable exchange data with a connected external device 202 using optical signals, radio frequency signals or other forms of signals that are specially adapted for data exchange using particular wireless or wired communication systems or standards. In this regard, interface circuit 204 can provide optical, radio frequency or other receiving and optionally transmitting circuits appropriate to enable such an exchange of data and interface circuit 204 can be adapted for communication with external devices 202 using a direct electrical or optical path and can comprise, for example, a serial or parallel port, or a networked interface to a computer network or the Internet.

Further, interface circuit 204 can also have appropriate circuitry to further convert any digital data from a received format into a format that can be used by DMF 102. Alternatively, interface circuit 204 can be adapted to receive a signal from one of external devices 202, to identify the type of protocol or data format being used to encode the signal and to determine whether a conversion of signal type or encodement is required. The need for a conversion of received data is determined if DMF 102 is unable to make use of the data contained in a received signal in the form that the signal is received in. In this latter embodiment, interface circuit 204 can provide signals to processing circuit 206 enabling control circuit to can perform an appropriate conversion of the data into a data format that can be used by DMF 102.

Processing circuit 206 controls the operation the DMF 102. Processing circuit 206 causes interface circuit 204, local memory 208, a display controller 210 and a display device 212 to display images in response to signals received from interface circuit 204, a user input system 214, and/or optional sensors 216 and audio system 218. Processing circuit 206 can comprise a microprocessor such as a programmable general purpose microprocessor, a dedicated micro-processor or micro-controller, or any other system that can be used to control operation of DMF 102.

Among other things, processing circuit 206 is adapted to analyze data received from interface circuit 204 to determine whether the data comprises instructions, a digital image or other data and to determine appropriate steps for processing such data. Processing circuit 206 can be adapted to edit, compress, modify or otherwise process and in this regard can be programmed for such use or can incorporate specific circuits such as signal processing circuits for this purpose.

A digital image can be associated with metadata. Such metadata generally comprises any form of data that is associated with the digital image but that is not necessarily presented as a part of the visually perceptible output. For example, such metadata can include but is not necessarily limited to data reflecting a time and/or date upon which the visual content used to form the digital image was captured or generated, a location of such capture or generation, conditions of capture or generation, the identification of a capture or generation device, an identification of a photographer, creator or editor of the visual content used to form the visual content data record, information characterizing the nature of the visual content, information that can be used in determining parameters for presenting the visual content depicted in the visual content data record, audio data or text data for presentation with the visual content data record, and/or keywords and or other indexing information.

Where processing circuit 206 determines that data received from interface circuit 204 comprises a digital image, processing circuit 206 can determine a location in memory 26 for the storage of the digital image so that, as required, processing circuit 206 can recall this digital image. Processing circuit 206 can also generate and/or store auxiliary information for each digital image. Such auxiliary information can include a color assignment. The color assignment maps out image color distribution from an available color grid according to the color distribution of the image data. The auxiliary information can also include date and time that the digital image was received by DMF 102, an Internet address that indicates which Internet node was used for sending the digital image to the DMF 102 or other source identifier information. The auxiliary information can also include Internet address links to other web sites that are related to the image. For example, if an image describes a child, the linked web sites that describe child's family or that are known to or that are likely to contain visual content data records related to the family or child such as web sites of other family members, schools, churches etc associated with the family or child. Image orientations, transitions, or other presentation related information determined by DMF 102 can also be stored as auxiliary information with the digital image by processing circuit 206.

In one embodiment, the auxiliary information can also comprise audio information including both edited versions of audio information provided in metadata or otherwise associated with the received visual content data file and audio information created or associated with the visual content data file after receipt of the visual content data file by DMF 102. Such audio information can be stored in memory 208 or elsewhere. Where stored elsewhere, location information is stored with the digital image indicating the location at which the audio information can be obtained. Optionally, DMF 102 can incorporate an audio circuit 118 that can be adapted to generate audible signals based upon such audio information and/or that can receive audible signals and convert these audible signals into digital audio information that can be stored.

Processing circuit 206 can receive control signals from external devices 202 by way of signals received at interface circuit 204 or from a user input system 114. Processing circuit 206 cooperates with user input system 214 to allow DMF 20 to directly to interact with a user. User input system 214 can comprise any form of transducer or other device capable of receiving an input from a user and converting this input into a signal that can be used by processing circuit 206 in operating DMF 102. For example, user input system 214 can comprise a push button, dial, rotatable controller, a touch screen input, a touch pad input, a 4-way switch, a 6-way switch, an 8-way switch, a stylus system, a trackball system, a joystick system, a voice recognition system, a gesture recognition system or other such systems.

User input system 214 can be in whole or in part fixedly incorporated into DMF 102 and alternatively some or all of the portions of user input system 34 can be separable from DMF 102 so as to provide a remote control (as will be described in greater detail below.)

User input system 214 can include an activation button that sends a trigger signal to processing circuit 206 indicating a desire to present visual content as well as other controls useful in the operation of DMF 102. For example, user input system 214 can be adapted to allow one or more people to enter system adjustment preferences such as hue, contrast, brightness, audio volume, content channel selections etc. In one embodiment, user input system 214 gives a user certain controls to guide processing circuit 206 in making decisions as to how to manage the presentation of images on DMF 102. Processing circuit 206 receives signals from user input system 36 that characterize the user input actions made by the user and interprets the signals in a manner that is intended to cause DMF 102 to operate in a manner consistent with the requested user input action. For example, where a user has made a user input action that is intended to indicate how images should be displayed, user input system 214 generates a user input signal that is received by processing circuit 206 and that is used by processing circuit 206 in determining how to display images.

Memory 208 is provided to allow processor 34 (or set of memory blocks) which may include, for example, one or more of the following: dynamic random access memory ("DRAM"), static random access memory ("SRAM"), read-only memory, ("ROM"), non-volatile memory, magnetic disk storage, magnetic tape storage, CD-ROM, DVD-ROM, and so on. In one embodiment, processor 206 controls the access to data stored in memory 208. It should be noted that memory 208 can also receive data from other circuits and systems, such as from interface circuit 204 and/or display controller 210.

Display controller 210 is capable of controlling display device 212. Display device 212 can comprise any known device for providing an image modulated light and can include but is not limited to, a liquid crystal display ("LCD"), a cathode-ray tube ("CRT"), a plasma display, an electro-luminescent display, an Organic Light Emitting Diode display, a scanned laser display or a silicon-based display. In the embodiment illustrated, processing circuit 206 provides a digital image to display controller 210 or converts relevant portions of a digital image into form that is then transmitted to display controller 210 which, in turn, converts such received digital image into display codes that are in a format that causes display device 210. In this regard, display device 214 can comprise an analog television, a digital television, computer monitor, projection system or other apparatus capable of receiving signals containing images or other visual content and converting the signals into such image modulated light.

To facilitate this, display controller 210 can also contain a memory to store the display codes. After conversion, display controller 210 transfers the display codes along with display controls to display device 212. It should be noted that display controller 210 can also receive input signals from other sources, such as user input system 214 or sensors 216.

Sensors 216 are optional and can comprise any form of circuit or system that can generate an output that reflects an environmental condition within or outside of DMF 102. Typically, such a sensor will comprise some form of transducer that generates or modulates an electrical or optical signal in response to a particular environmental condition. Examples of such sensors include but are not limited to any conventionally known pressure sensor, proximity sensor, distance sensor, single or multi-spot rangefinder, temperature sensors, infra-red sensors, contact sensors and the like.

Audio system 218 is likewise optional and can include any known system for converting digital audio signals provided by processing circuit 206 or memory 208 into an audible signal.

Moreover, there is a power block (not shown in the figure) that can include either or both of an AC power supply and/or a DC power supply. In one embodiment, the DC battery backup power supply is employed for preventing memory loss upon AC power supply disconnection. Such an AC power supply can, for example, obtain power from line currents through a direct electrical connection or an inductive connection therewith and convert such power into a form that is useful in operating DMF 20. Such a DC power supply can comprise a fuel cell or a battery which can be recharged using converted AC power, or other forms of power such as photovoltaic cell (not shown) which can be integrated into DMF 102. The processing circuit 206 can optionally be used to manage a low power management circuit to conserve power consumption upon disconnection of AC power supply and/or to manage recharging of batteries during connection to an AC power supply.

Figure 3:
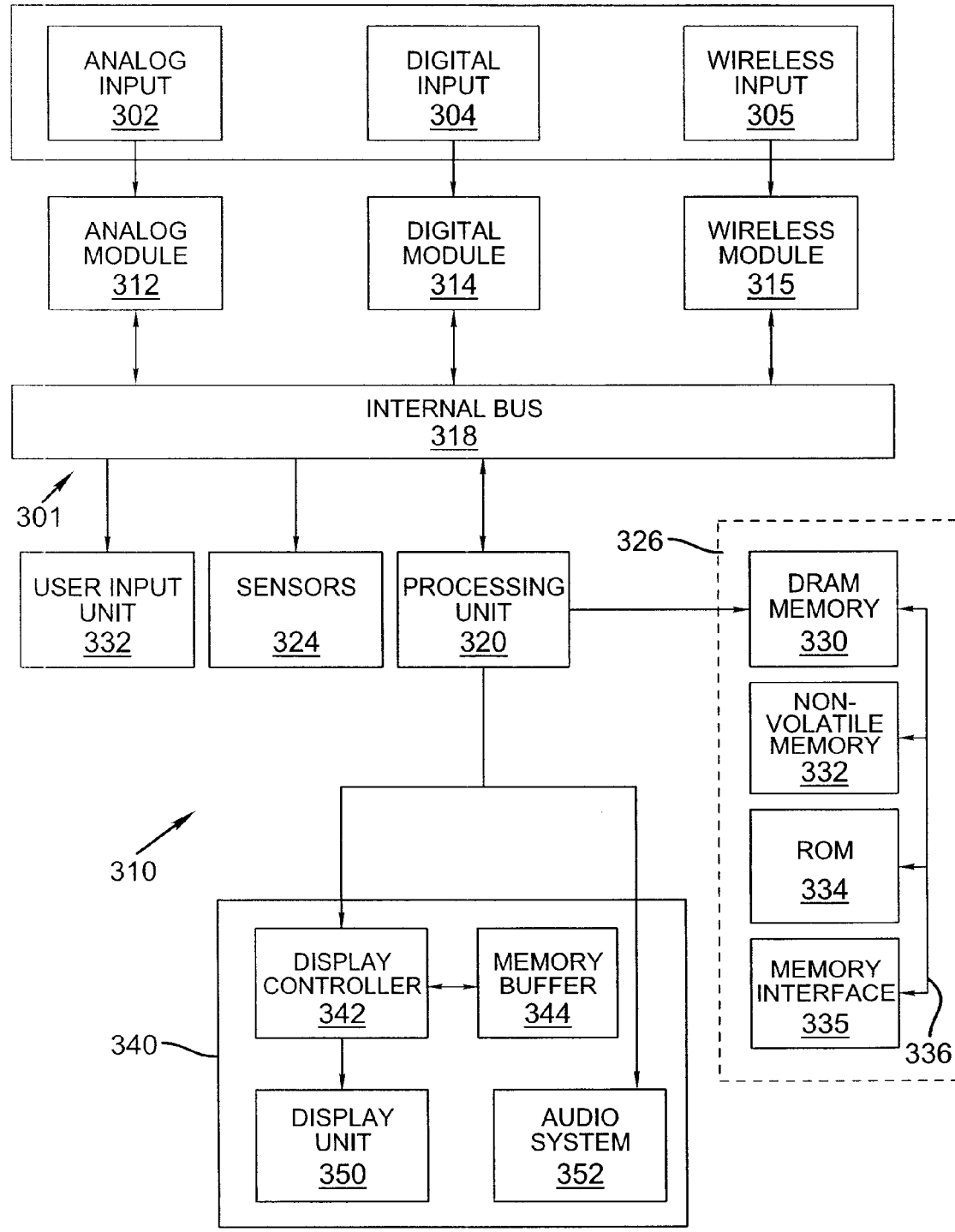
FIG. 3 illustrates a block diagram of another embodiment of a DMF.

FIG. 3 illustrates a detailed architecture of one embodiment of a DMF 300 with an interface block 301, a processing block 310 and a displaying block 340. In this embodiment, interface block 301 receives signals from external devices (not shown) or captures image, video or audio signals and in turn provides signals to processing unit 320 based upon such signals. Processing block 310 receives digital images from interface block 301 and causes the received digital images to be presented by displaying block 340 based upon the signals received from interface block 301 or takes such other action as may be indicated by the received signals from interface block 301 or by signals received from a user input unit 322.

In this embodiment, interface block 301 is illustrated as having an analog input circuit 302, a digital input circuit 304, and wireless input circuit 305. The analog input circuit 302 is optional and can comprise, for example, an analog input device, such as an analog video camera or sound source or a connector that allows DMF 300 to be connected to such an analog video camera or sound source. Analog input circuit 302 can optionally provide any appropriate impedance matching and buffering circuits. Analog input unit 302 transfers the analog image data to an analog module 312 and can include for example, an analog receiver circuit (not shown) and a synchronizing circuit (not shown). In such an embodiment, analog receiver circuit receives analog signal from analog input circuit 302 and the synchronizing circuit performs analog to digital conversion and subsequently synchronizes the converted image data, audio data or other data representing the signal received at the analog input to generate image data. After the data is received and synchronized, analog module 312 drives the digital image data, audio data or other data on an internal bus 318.

Digital input unit 304 can be a digital input device, such as a digital still camera, digital video camera or digital audio signal source, or it can be a connector that allows such devices to be connected to DMF 102 for the exchange of data therewith. Digital input unit 304 is capable of generating digital images according to data received at digital input unit 304 that represents captured images, video, audio or other information. Digital input unit 304 is further capable of generating instruction data or other data from digital inputs received at input 304. After properly generating the digital image data or instruction data, the digital input unit 304 transfers the digital data to processing circuit 206 or to a memory system 336 directly or by way of internal bus 318.

In one embodiment, a digital module 314 includes a digital receiver circuit and a translation circuit (not shown in the figure). In one embodiment, the digital receiver circuit may include a universal serial bus ("USB") port for receiving digital data from the interface block 314. Upon receipt of the digital data, the translation circuit determines whether a translation of the data is needed. A translation is required if the data format of the input data is a foreign data format. The foreign data format is a type of data format or protocol that the DMF 300 is unable to implement. In one embodiment, the DMF 300 has multiple native data formats, and is also capable of recognizing multiple foreign data formats. Consequently, the foreign data format of the image data must be converted to a native data format before the image data can be implemented for display. After the image data is properly received and translated, the digital module 314 drives the received digital data on internal bus 318.

Another example embodiment of such digital input 304 is one that is adapted to enable communication using hardware and protocols that are consistent with the EIA/TIA-232-E standard entitled "Interface Between Data Terminal Equipment and Data Circuit-Termination Equipment Employing Serial Binary Data Interchange" prepared by the Electronic Industry Association and the Telecommunications Industry Association. Other example embodiments of a communication circuit of this type include circuits and systems that conform with the standards set for the universal serial bus standard, and the IEEE 1394 (so-called "Firewire") standard. Digital input 304 can also comprise circuits and systems that comply with other standards or that comply with proprietary standards.

Wireless input circuit 305 comprises circuits and systems that enable DMF 20 to communicate with external devices 40 using wireless communication protocols. For example, wireless input circuit 305 can cooperate with wireless module 315 to provide circuits and systems that communicate in ways that conform to wireless communication standards such as the so-called "Wi-Fi" standards established and described at Institute of Electrical and Electronic Engineers standards 802.11a, 802.11b, 102.11g and 802.11n, the so-called "Bluetooth" wireless standard including Version 1.2, adopted November, 2003 by the Bluetooth Special Interest Group, Bellevue, Wash., U.S.A., or Version 2.0+Enhanced Data Rate (EDR), adopted November, 2004 by the same or any other such wireless communication standard developed by the Institute of Electrical and Electronic Engineers, the Bluetooth SIG or others in this field.

In another example, wireless communication circuit 305 and wireless module 315 can be adapted to communicate by converting digital data into infrared optical signals or to convert infrared optical signals into digital data using infrared technology that performs such conversions in accordance with protocols established by the Infrared Data Association (IrDA). Such protocols include, but are not limited to the Serial Infrared Protocol (SIR) and other protocols developed by the IrDA.

As is shown in the embodiment of FIG. 3, memory 326 can take any of a variety of forms, and in this embodiment comprises a DRAM 330, non-volatile memory 332, Read Only Memory 334, and removable memory interface 336 that is adapted to receive a removable memory such as an optical disk medium, a flash memory card or a jump drive.

As is further illustrated in FIG. 3, internal bus 318 is used to interconnect analog module 312 digital module 313, wireless module 315, user input system 36, processing circuit 206, memory 326, and display controller 342.

As discussed in greater detail above processing circuit 206 generally controls the operation of DMF 300 which can involve to performing functions including image size scaling, color space conversion, image filtering, image decoding, image data compression/decompression, and so on. In one embodiment, processing unit 320 is used to control the internal bus 318, such as issuing bus busy and bus grant signals. Processing unit 320 can be further configured to control access to memory 326 by controlling a memory control bus 336, which carries various control signals. In another embodiment, processing unit 320 can control access to memory 326 using internal bus 318 for issuing control signals, such as bus grant and bus busy signals.

It should be noted that other types of bus connections and bus controls are possible. For example, in one embodiment, processing unit 320 can control the internal bus 318 and control bus 336. While the control bus 336 is used for control signals, the internal bus 318 is used for data. It should be noted that the internal bus 318 and the control bus 336 can be merged into one single bus. In another embodiment, the internal bus 318 contains a conventional bus controller (not shown) to control the bus access.

Processing circuit 206 is configured to determine a manner for presenting images, a sequence of sequence of images, video streams and other visual content on display unit 350. This can involve, for example, determining time intervals for presenting the visual content, time transition types between images. The interval transition time indicates the time interval between the current image and the next image to be displayed. The image transition is a mechanism of retiring the presentation of a current image while phasing in the next image. In one embodiment, the image transition moves current and next images in one direction as the current image move out while the next image moves.

In another embodiment, processing circuit 320 can map out image colors from available color grid according to color attributions of the visual content data record. In this embodiment, processing circuit 320 further generates auxiliary information for each image, where the auxiliary information may contains a color assignment, date and time of the image data generated and received, Internet addresses, audio information, image orientations, and so on.

User input unit 322 can incorporate any known input device that can convert an user input action into a signal that is indicative of the user input action taken and that can be used by processing unit 320. User input unit 332 can incorporate devices such as a push button switch, a touch screen input device, remote control device, or a sound activated input device (speech recognition input-output device), and so on. In one embodiment, the user-input unit 322 provides display controls to users, such as a fast forward, a reverse, and pause functions. The fast forward function allows a user to view the next image, while the reverse function allows a user to view the previous image.

Sensors 324 are optional and can comprise any form of circuit or system that can generate an output that reflects an environmental condition within or outside of DMF 102. Typically, such a sensor will comprise some form of transducer that generates or modulates an electrical or optical signal in response to a particular environmental condition. Examples of such sensors include but are not limited to any conventionally known light sensor, pressure sensor, proximity sensor, distance sensor, single or multi-spot rangefinder, temperature sensors, infra-red sensors, contact sensors and the like. Signals from sensors 324 can be used as an input to processing unit 320 from which processing unit 320 can make determinations about when, where, and how to present images. For example signals from a light sensor can be used to determine image intensity and contrast characteristics, while signals from a range finder can be used to determine whether any person is present to view a presentation of images, and also to determine the relative location of such a person with respect to the DMF which, in turn can influence selections of digital images, font sizes, line thicknesses, and the like.

In yet another embodiment, processing circuit 320 is capable of receiving, from an external device 100, instruction data identifying a predetermined sequence for displaying digital images and where such instructions are received, processing circuit 320 can present the digital images in the in the predetermined sequence. Moreover, a sequence of digital images to be displayed may be altered by control signals from a user, such as a pause signal from the user-input unit 332.

In one embodiment, the sequence of the images to be displayed is a function of where the image data is to be stored in the memory. In this embodiment, the image display block 340 fetches the next image data from a predefined physical memory location. In another embodiment, a sequence of the images to be displayed can be reordered by processing circuit 206. In yet another embodiment, the sequence can be further altered by a user using the user-input unit 332.

In yet another embodiment, processing circuit 320 is capable of receiving, from an external device 100, instruction data identifying a predetermined sequence for displaying digital images and where such instructions are received, processing circuit 320 can present the digital images in the in the predetermined sequence. Moreover, a sequence of digital images to be displayed may be altered by control signals from a user, such as a pause signal from the user-input unit 332.

In one embodiment, the sequence of the images to be displayed is a function of where the image data is to be stored in the memory. In this embodiment, the image display block 340 fetches the next image data from a predefined physical memory location. In another embodiment, a sequence of the images to be displayed can be reordered by processing circuit 206. In yet another embodiment, the sequence can be further altered by a user using the user-input unit 332.

When the digital images to be presented are properly identified and ordered, processing circuit 320 drives the digital images together with any associated metadata or any auxiliary information on internal bus 318 to image display block 340. In one embodiment, processing circuit 320 uses a private bus (not shown in the figure) between processing circuit 320 and display controller 342 for transferring a digital image out of memory 326 for use in generating a display image. Upon receipt of the visual content data record, display controller 342 prepares images for display based upon the digital image and optionally, the auxiliary information and causes the images to be sent to image display block 340.

Image display block 340 contains display controller 342, display unit 350, an optional display memory buffer 344 and an optional audio circuit 370. In one embodiment, the display unit 350 is a LCD. However, display unit 350 can take any other known form of device that is capable of providing image modulated light. After receiving the image data, display controller 342 generates an image display code in response to the image data. Optionally the selected display code can also be based at least in part upon the metadata or auxiliary information associated with the digital image that is the source of the image data. Display unit 350, subsequently, receives display codes for images from the display controller 342 and displays the image. In one embodiment, the display controller 342 stores a set of display codes in memory buffer 344. In another embodiment, display controller 342 stores the display code in the non-volatile memory 332 or DRAM 330.

Audio system 352 is likewise optional and can include any known system for converting digital audio signals provided by processing unit 320 or memory 326 into an audible signal.

It should be noted that the display controller 342 could be integrated into the display device 30 or be integrated into processing circuit 206. Also, it will be appreciated that any of the components of DMF 300 can be integrated into a single integrated circuit ("IC") or otherwise provided on an integral platform.

Figure 4:
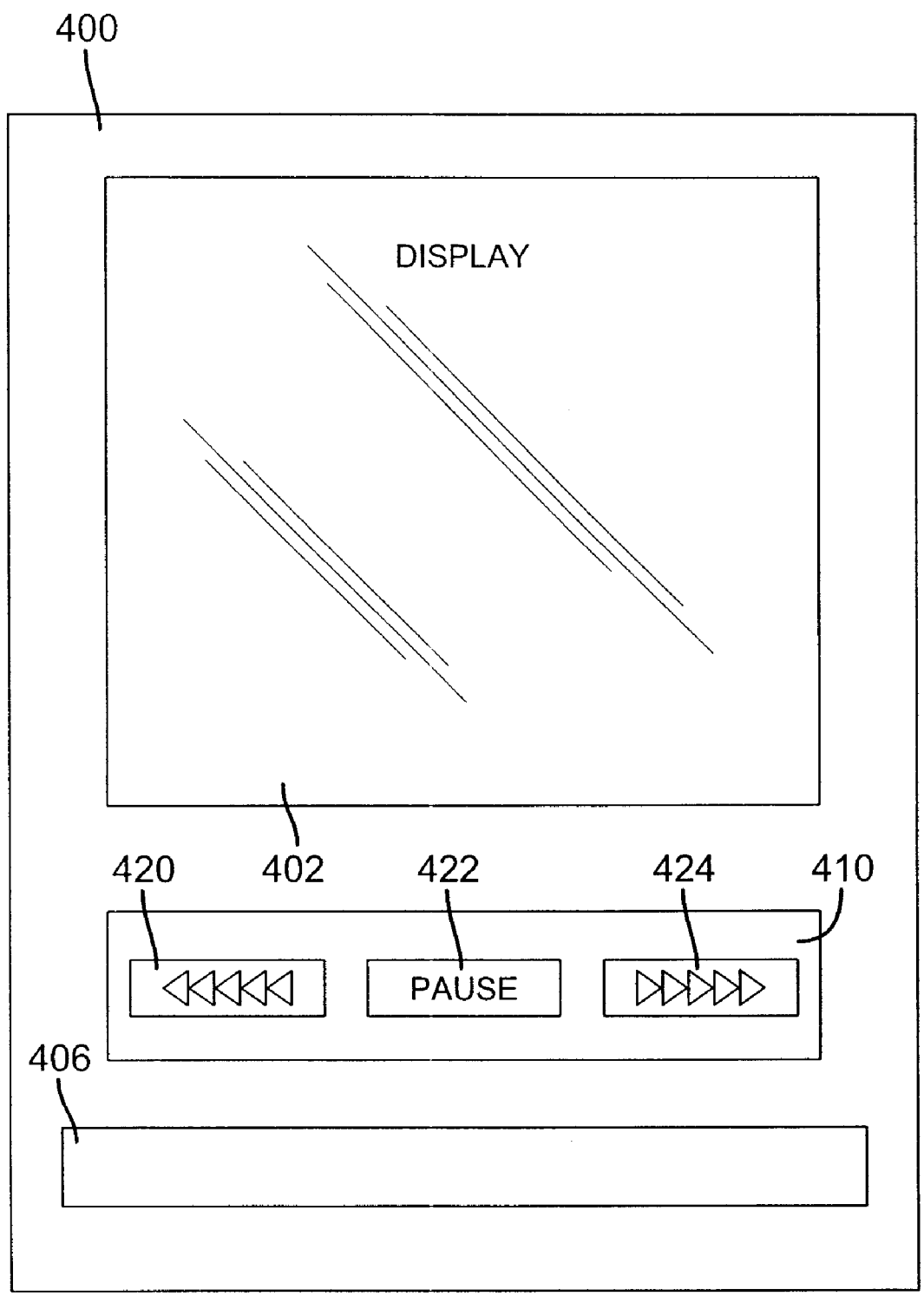
FIG. 4 illustrates an exterior view of one embodiment of a DMF having a display, a processing unit, and a user input device.

Referring to FIG. 4, an exterior view of one embodiment of a DMF 400 is illustrated. As shown in FIG. 4, DMF 400 has an exterior surface 401 with openings that and that allow image modulated light from display unit 402 to exit from exterior surface 401 and that allow access to user input system 410, which in this embodiment provides a reverse button 420, a pause button 422, and a fast forward button 424. Reverse button 420 allows a user to view previously displayed images, while the fast forward button 424 allows a user to view next sequential images. Pause button 422 causes a currently displaying image to freeze until a release command is issued by a subsequent activation of the pause button 422. In another embodiment, the user-input system 410 may be merged with the display unit 402, where inputs can be made through a conventional touch screen input device. In yet another embodiment, the inputs can be made through a conventional voice activated input device, such as a speech recognition input/output device. In yet another embodiment, the inputs come from a computer using conventional port connections.

Figure 5:
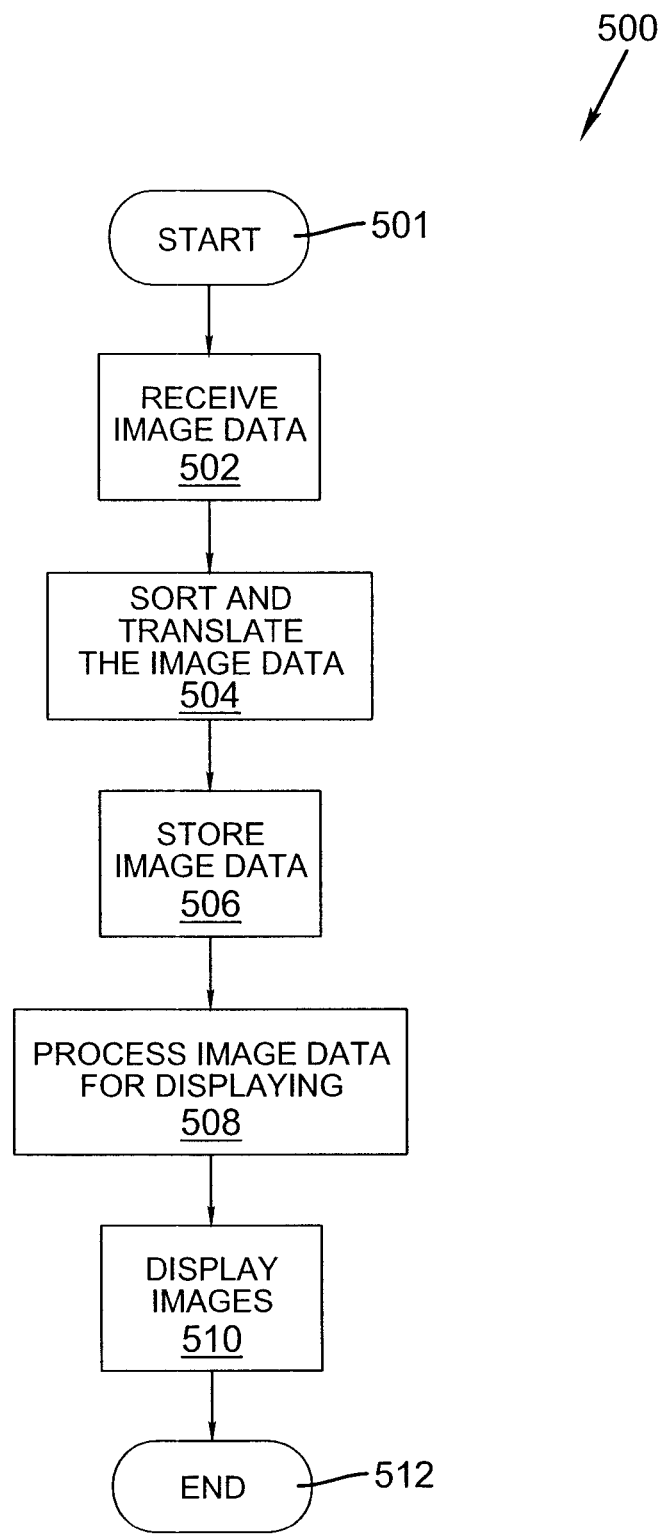
FIG. 5 is a flow chart illustrating a data flow in one embodiment of a DMF.

FIG. 5 is a flow chart illustrating a data flow within the DMF 400. A process of image displaying starts at block 501. The process proceeds to block 502, where an interface unit of the DMF 400 receives the digital images for presentation on the DMF and any instructions for presenting the digital images such as a predetermined sequence of images. As noted above, the image data may be captured by image capturing devices, such as a digital or video camera. Upon receipt of the digital images, the interface unit 301 identifies whether the digital images have image data that is in a digital data format or in an analog data format. If the image data is in the analog data format, the interface unit will convert the analog data format to a digital data format. If the image data is in the digital data format, no conversion from analog to digital ("A/D") is needed.

After block 502, the process proceeds to block 504, where the digital images are sorted in a predefined sequence or a special ordered sequence of images. The determination of a presentation sequence can be made in a variety of ways, in particular, the digital images can be stored in a first in first out buffer from which digital images are drawn and presented in a sequential manner in order of receipt. In another approach, digital images are received with data that identifies a preferred sequence for presenting the digital images. In still another approach, the digital images can be associated with a timing signal that can be used to determine timing for presenting the images. The timing signal can comprise for example, a simple clock signal or a continuous stream of video or audio information that will be presented during the presentation of the digital images. The digital images are associated with the timing signal such that they will be presented at particular times relative to the continuous presentation of video or audio information. In this approach, the sequence of digital images follows the timing signal. Other approaches can be used as will be described in greater detail below.

Before moving on to the next block, the process determines whether a translation is required. A translation is needed if the DMF 400 identifies that the data format of the image data is a foreign data format. Consequently, the foreign data format must be translated into a DMF native data format before the image data can be further processed. After the image data is properly sorted and translated, the process proceeds to the next block.

The process moves from block 504 to block 506, where the image data is stored in the memory. In one embodiment, the location of the image data stored determines the sequence of the images to be displayed. After block 506, the process proceeds to block 508, where the image data is converted to display codes. In one embodiment, block 508 determines the interval transition time and the various types of image transitions. The interval transition time indicates the time interval between the current image and the next image to be displayed. The image transition is a mechanism of retiring current images from the display while phasing in the next image. In one embodiment, the image transition moves current and next images in one direction as the current image moves out while the next image moves in. In another embodiment, the image transition fades out the current image while fading in the next image. After block 508, the process proceeds to block 510, where images are displayed according the image data together with the auxiliary information. The process ends at block 512.

Figure 6:
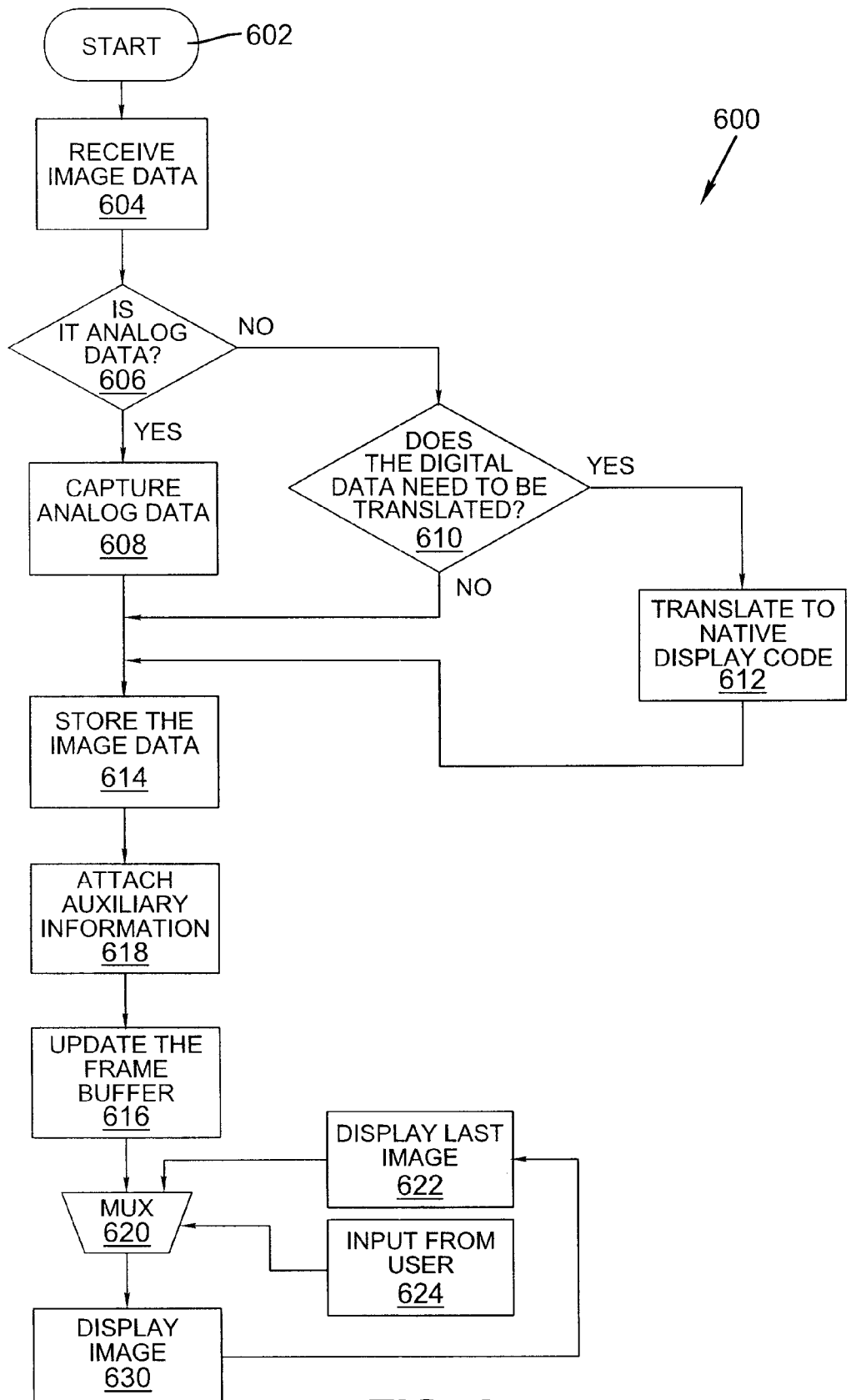
FIG. 6 is a flow chart illustrating one embodiment a data control of a DMF.

FIG. 6 is a flow chart illustrating an embodiment of a controlled data flow of DMF 600. A process of image display starts at block 602. The process moves from block 602 to block 604, where an interface unit of the DMF receives the image data representing digital images to be presented, which may be captured by image capturing devices, such as digital or video cameras. Upon receipt of the image data, the process proceeds to block 606, where the process identifies whether the image data is in analog or digital data format. If the image data is in analog data format, the process proceeds from block 606 to block 608. At block 608, the process converts the analog data format into digital data format. After conversion, the process proceeds from the block 608 to block 614, where the image data is stored.

If the image data is not in analog data format, which indicates that the image data is in digital data format, the process proceeds from block 606 to block 610. At block 610, the process identifies whether the digital image data needs to be translated into a DMF recognizable digital data format. If the digital data format of the image data is recognizable, the process proceeds from block 610 to block 614.

If the image data is a foreign data format, the process moves from block 610 to block 612, where a translation is performed. At block 612, the foreign data format of input image data is translated into a DMF native data format. In one embodiment, the DMF may have several native data formats, which will reduce the frequency of translation. In another embodiment, the DMF is capable of identifying multiple foreign data formats. After translation, the process proceeds from block 612 to block 614, where the image data is stored.

In one embodiment, the image data is stored in a nonvolatile memory device, such as a flash memory, for preventing data loss upon disconnection of power supply. In another embodiment, portable battery power supply is used to prevent data loss upon disconnection of power supply. In yet another embodiment, the image data is stored in a magnetic storage, such as a magnetic disk storage or a magnetic tape storage, for preventing memory loss. After block 614, the process moves to block 618, where the auxiliary data is attached to each image.

At block 618, the process aligns images and attaches the auxiliary information to each image. In one embodiment, the alignment of images can be sequential according to the order of the memory location that the image data stored. In another embodiment, the alignment of images is predefined. The auxiliary information contains the information of a color assignment, a date and time of the image generated, information of Internet addresses, audio, image orientations, and so on.

After attaching the auxiliary information, the process proceeds from block 618 to block 616, where the image data together with the attached auxiliary information are stored in a memory buffer. The memory buffer is a small and fast memory device that provides fast memory access for displaying images. In one embodiment, the memory buffer is nonvolatile memory device to prevent memory loss upon power disconnection. In another embodiment, the memory buffer is regular random access memory having a backup portable power supply to prevent memory loss. After block 616, the process moves to block 620, where the output from the memory buffer can be selected for displaying.

At block 620, the process further receives signals from block 624 and block 622. The block 624 contains input control signals from the user, while the block 622 contains the image data for the last displayed images. The process at block 624 receives a user input, which may indicate to pause the current image. In another embodiment, the user input is used as one of many combinational logic inputs for selecting the next image.

Upon selecting the image data, the process proceeds from block 620 to block 630, where the image is displayed. When the current image is displayed, the process proceeds from block 630 to block 622, where the current image is stored. In one embodiment, block 622 stores the image data only for one image, which is the last displayed image. In another embodiment, block 622 stores the image data for a set of recently displayed images.

In one embodiment, DMF has a pictorial mode and an information mode. While the pictorial mode of DMF displays a sequence of predefined pictures, the information mode of DMP displays a set of information or data, such as news, financial data, advertising, and the like. A third mode, of a combination of pictorial and informational modes may be formed where the DMF dedicates a portion of the screen to pictorial display while another portion of the screen is apportioned to informational display. It should be noted that other types of display modes may be existed, but they are not important to understand the invention.

As discussed previously, DMF is capable of sending and receiving information over a network, such as the Internet. Various categories of information that are available over the Internet are also available to DMF. Accordingly, DMF, in one embodiment, can display several categories of information when it is in the information mode. For example, such categories can include news, sports, entertainment, financial data, et cetera. However, in order to display multiple categories of information in the information mode, DMF has to be set up or configured to handle multiple sets of information. In one embodiment, the information mode of DMF is configured through a DMF server, as will be described in more detail below.

Figure 7:
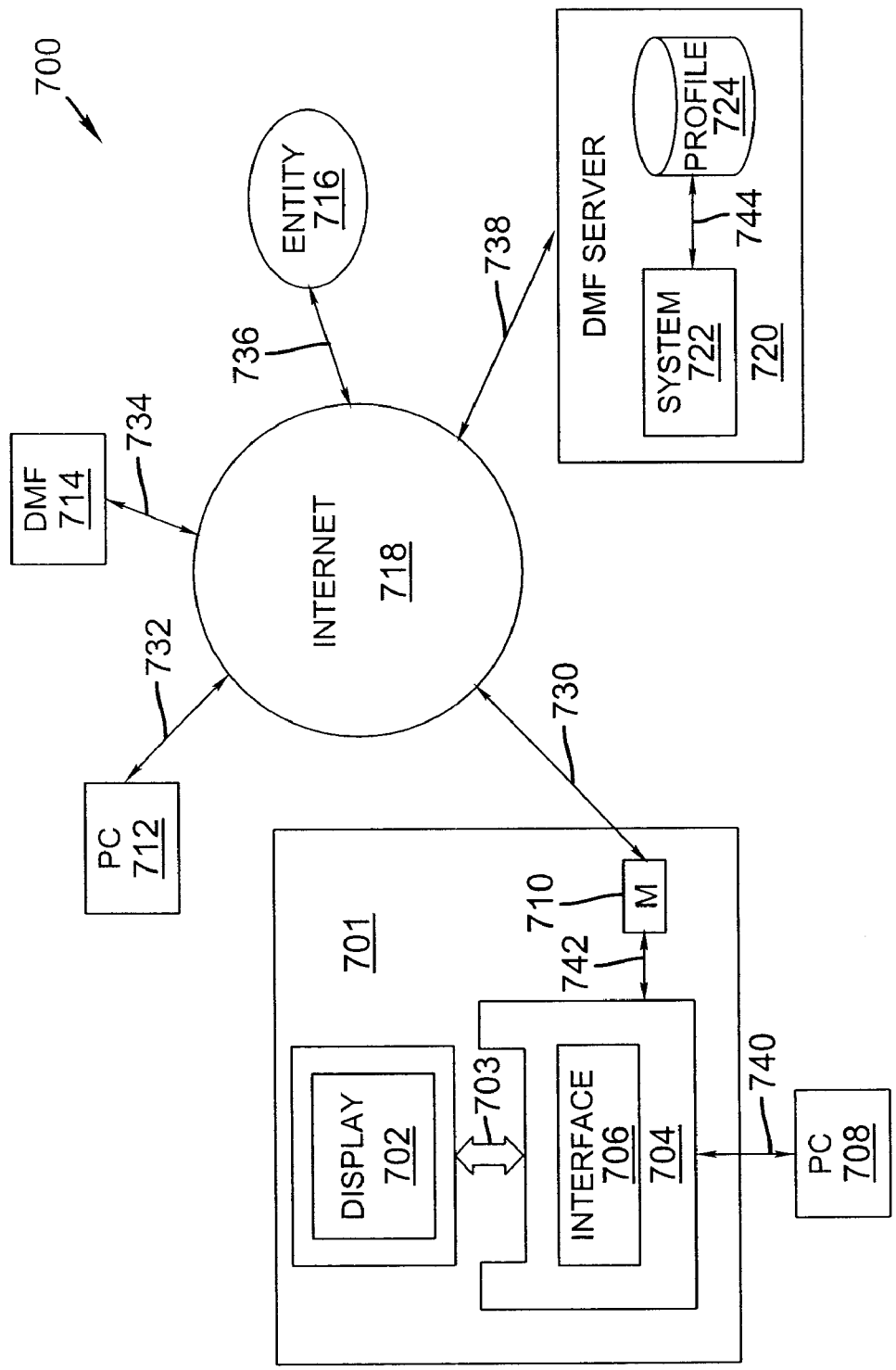
FIG. 7 illustrates one embodiment of a network configuration involving a DMF.

FIG. 7 illustrates one embodiment of a network configuration 700. Configuration 700 contains a DMF 701, a PC 712, a PC 708, a DMF 714, an entity 716, a DMF server 720, and the Internet 718. Various conventional connecting cables, such as, cables 730-738, are used to provide device communications through the Internet 718. DMF 701 further contains a display 702, a base 704, and a network-communicating device 710. Display 702 and base 704 are connected using a connecting device 703. In one embodiment, connecting device 703 is a cable. In another embodiment, connecting device 703 is a conventional cordless connecting device. Moreover, base 704 contains an interface circuit 706, which is used to receive and to send information to other devices.

Network-communicating device 710 may be a modem or a cordless modem, such as a cellular modem. In one embodiment, network-communicating device 710 is a one-way transmitting device, such as a pager type of one-way communication device. In another embodiment, network-communicating device 710 is a two-way communicating device, which may facilitate an interactive communication between devices. In one embodiment, DMF 701 uses a cellular modem to communicate with PC 712, DMF 714, and entity 716 or DMF server 720.

PC 712 is, for example, a personal computer and it can communicate with DMF 701 via the Internet 718. DMF 714 is another digital media frame that is capable of communicating directly to DMF 701 via the Internet 718. For instance, DMF 714 may use the Internet 718 as a network vehicle to deliver a set of images to DMF 701. Moreover, entity 716 can be a corporation or a group of devices, which may include multiple DMFs and PCs. In one embodiment, DMF 701 is capable of accessing to any device that is connected to the network.

DMF server 720 is a network server that provides DMF network service for DMF devices connected to the network. It will be appreciated from the use of the Internet 718 to provide networking between the devices, that the system of FIG. 7 can be implemented using telecommunication, closed, private, or proprietary networking solutions to interconnect the devices.

In one embodiment, DMF server includes a system 722 and a user profile database 724. DMF network service provides user and data services, which can be used to configure DMF. In one embodiment, the DMF network service supplies a DMF web page, which allows users to configure or receive the DMF network services. In this embodiment, the DMF web page lists multiple categories of images the user can subscribe to. Alternatively, the DMF web page may list multiple commercially available web sites and a user can select listed web sites to view his or her DMF. Commercially available web sites may include, but are not limited to, stock market news, sports, and weather channels. After the user selected the listed categories or web sties, the DMF network service creates a user profile and stores the selected categories or web sites in the user profile. The user profile can also be used to characterize the content collection by use of significant dates for various events the life of the family as well as outlining the relationships among family members, assigning names to faces for face recognition, places to GPS information, etc. The user profile can later be used as a default configuration for the corresponding DMF.

The DMF network service, in one embodiment, is responsible to maintain the user profile database 724. In this embodiment, the user profile database 724 is resided on DMF server 720. It should be noted that the user profile database 724 could be located on any other network server as long as the DMF network service can access the network serve through the network. The user profile database 724 can be modified either using DMF 710, PC 712, or other devices, which can directly access the DMF server web site. A user can also call a DMF network service provider to verbally convey to a DMF network service representative a new user DMF configuration. More detailed description about accessing the DMF network service will be described later.

Other methods of configuring DMF are possible. For example, DMF 701 could be configured by PC 708 or PC 712. Also, DMF 701 may contain configuration software, which allows DMF 701 to configure itself. It should be noted that other methods for configuring DMF 701 are possible, but they are not necessary to understanding the invention.

Figure 8:
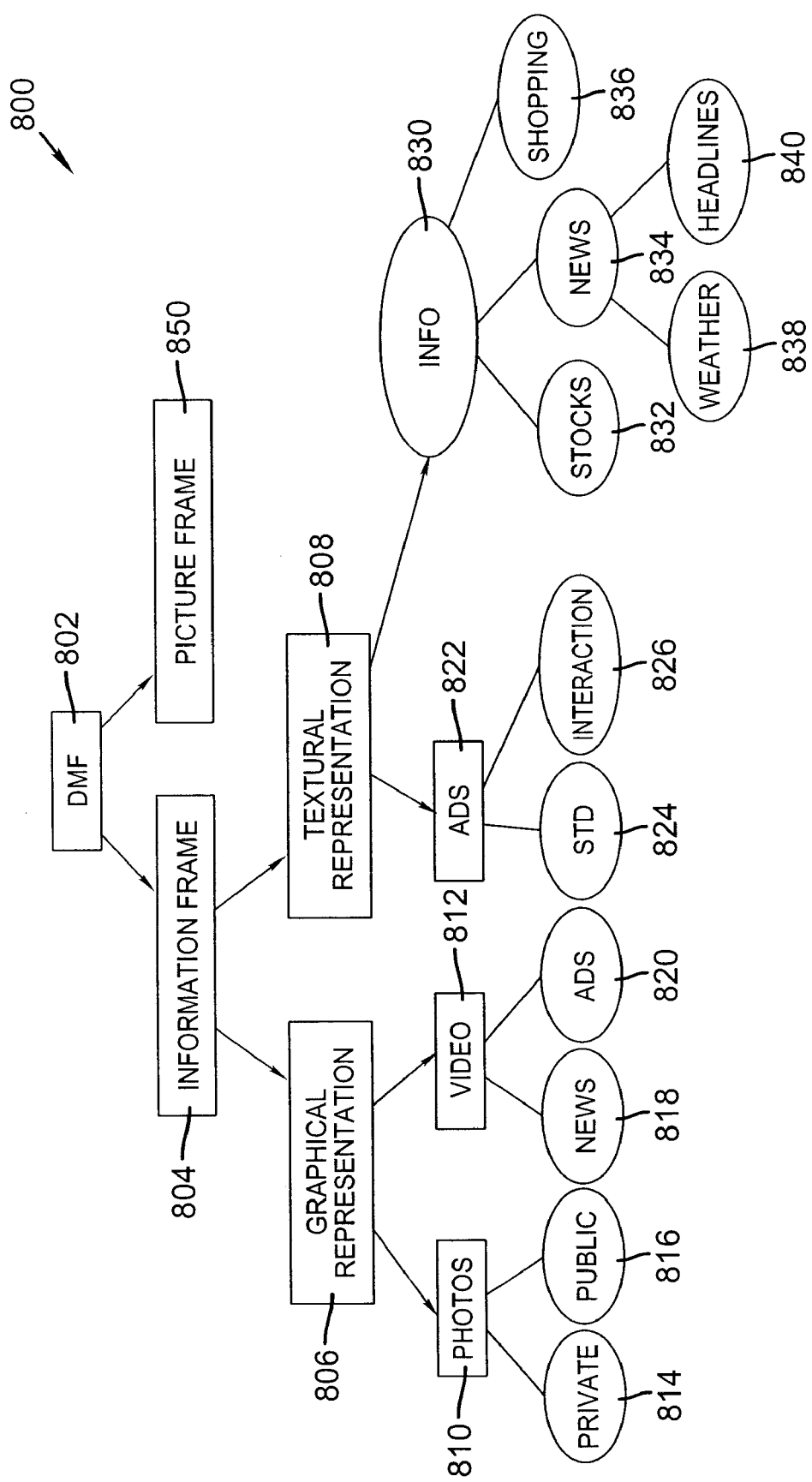
FIG. 8 illustrates an embodiment of architecture of a DMF.

FIG. 8 illustrates an embodiment of a DMF architecture 800. DMF 802 includes an information mode 804 and a picture mode 850. Information mode 804 displays informational data, such as stock trading news. Picture mode 850 displays a sequence of pictorial images that are previously received and stored in the memory.

Information mode 804 further contains a graphical representation portion 806 and a textural representation portion 808. Graphical representation portion 806 displays pictorial images while textual representation portion 808 displays text or letters. Graphical representation portion 806 can be further split into photos portion 810 and video portion 812. The photo portion 810 includes still pictorial images and video portion 812 contains motion images. Photo portion 810 can be further divided into private block 814 and public block 816. Private block 814 refers to individual photos, for example, an individual creates a photograph for private use.

Video block 812 can be also divided into a news portion 818 and an advertisement portion 820. News portion 818 refers to a motion picture, such as, a section of videotape from a news reporter. Advertisement portion 820 refers to marketing, which may be an interactive commercial advertisement.

Textural representation portion 808 contains an advertisement portion 822 and an information portion 830. While advertisement portion 822 refers to commercial marketing, information portion 830 denotes useful information, such as weather and stock trading news. Advertisement portion 822 is further divided into a standard section 824 and an interactive section 826. Standard section 824 refers to commercial messages using words and text. Interactive section 826 refers to commercial messages using text interactively, such as an on-line gambling.

Information portion 830 further contains a stock section 832, a news section 834, and a shopping section 836. In one embodiment, stock section 832 refers to stock trading news using text and shopping section 836 refers to on-line shopping using textural representations. News section 834 can be further split into weather channel 838 and news summary channel or headline news 840. Weather channel 838 refers to weather report using text while news summary channel 840 summarizes news. It should be appreciated that any portion of information frame 804 and picture frame 850 can be overlaid to produce a frame that appears as a combination of information and pictures. It should be noted that other categories or portions are possible, but they are not necessary to understanding the present invention.

Figure 9:
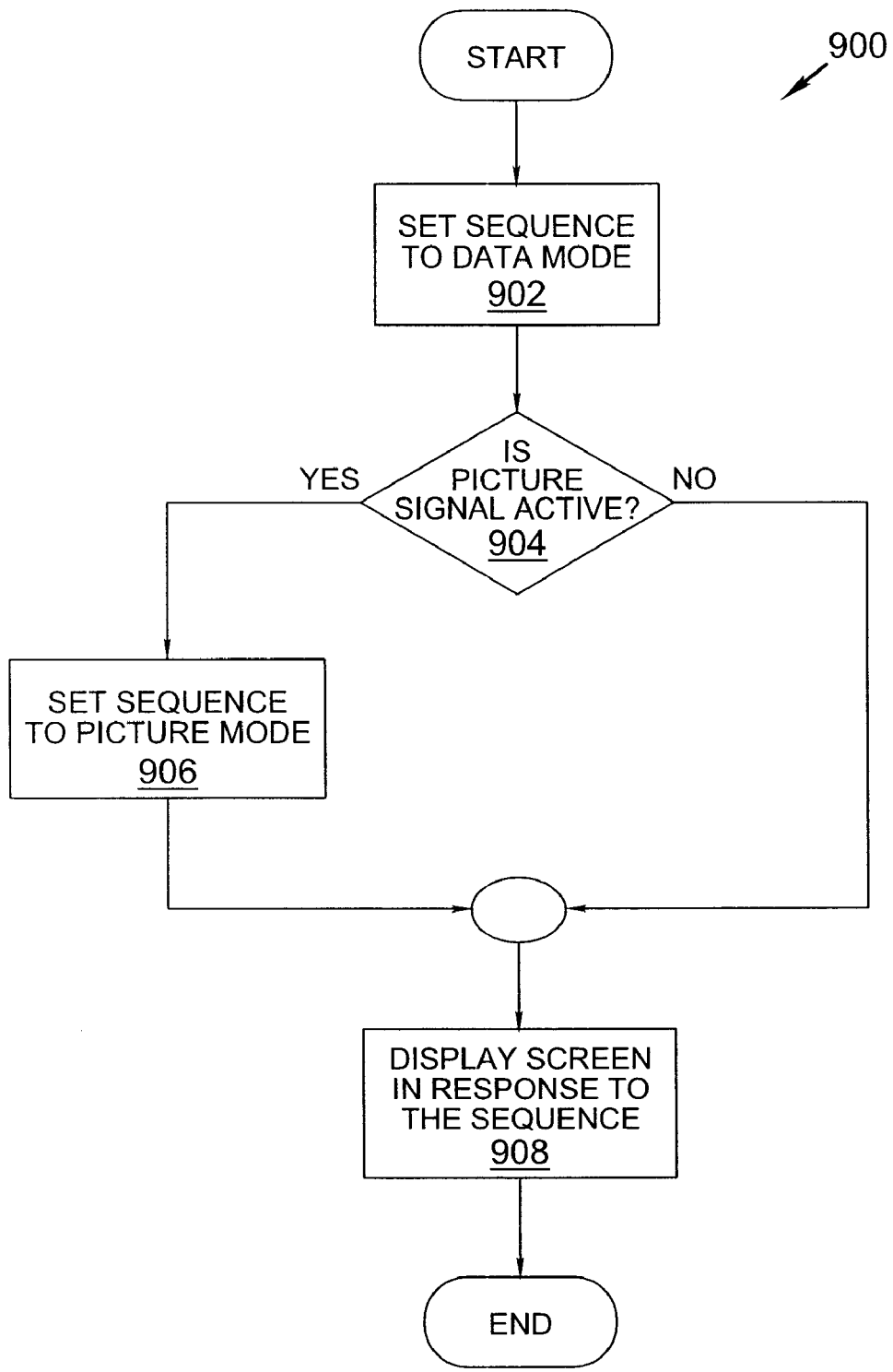
FIG. 9 is a flowchart illustrating an embodiment of multiple modes for displaying images.

FIG. 9 is a flowchart 900 illustrating an embodiment of multiple modes for displaying images. Block 902 shows a step of setting the display sequence to data mode. At block 904, the process determines whether the picture signal is active. If the picture signal is active, which indicates that the picture mode should be set, the picture mode is set at block 906. At block 908, the process displays images according to the display modes. After block 908, the process ends.

Figure 10:
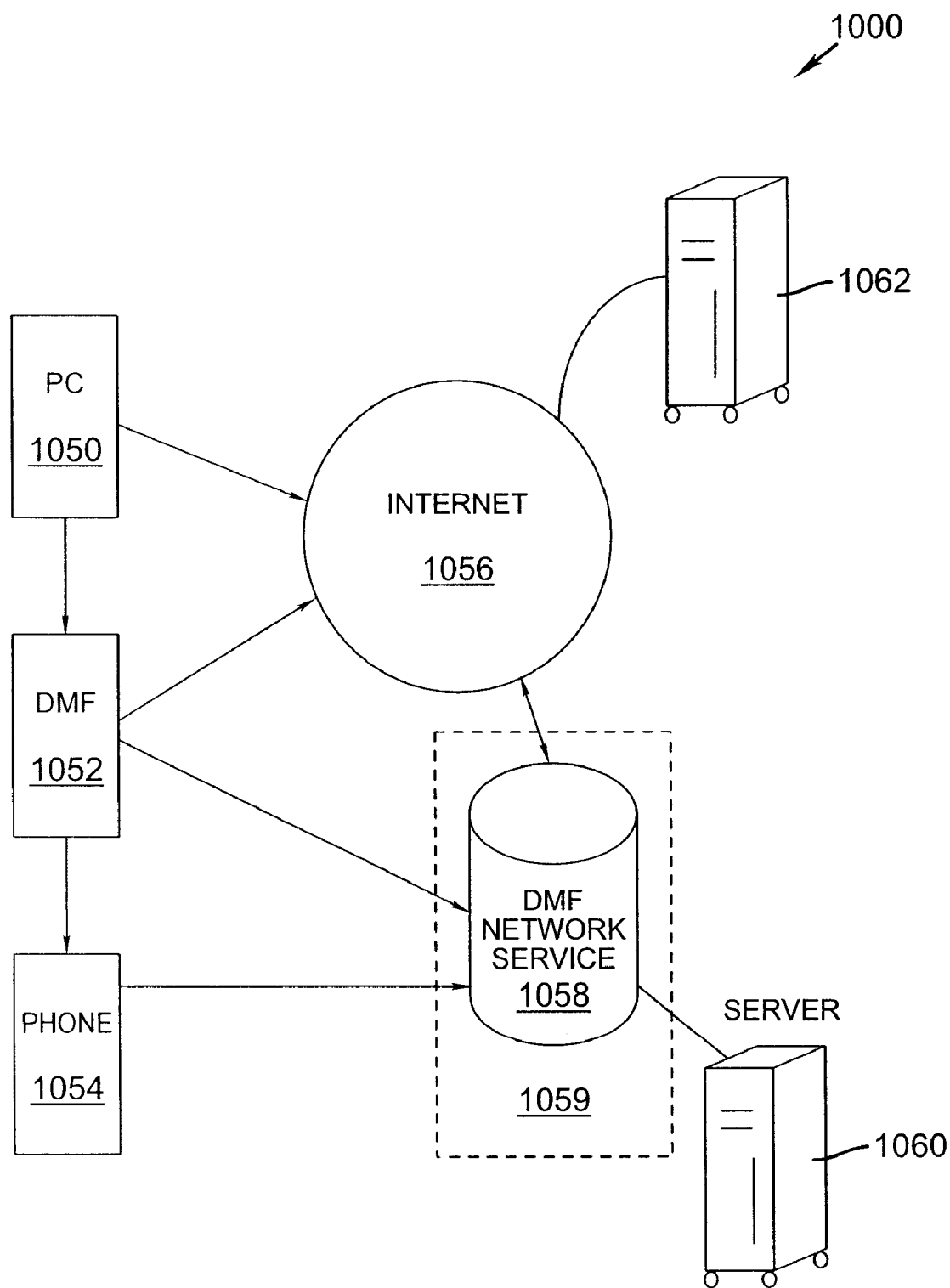
FIG. 10 illustrates an embodiment of multiple mechanisms of accessing DMF network service.

FIG. 10 illustrates an embodiment of a mechanism 1000 showing multiple schemes to access the DMF network service. Mechanism 1000 includes a PC 1050, a DMF 1052, a telephone 1054, a server 1060, a server 1062, and a DMF network server ("DNS") 1059 and all devices are interconnected via the Internet 1056. DNS 1059 supports DMF network service 1058, which provides data implementation. In one embodiment, DMF network service 1058 contains a user profile database, which may be physically located at DNS 1059, server 1060, or server 1062. To access user profiles, a user may use a PC, 1050, a DMF 1052 or a telephone 1054 to access the user profile through DMF network service 1058.

In one embodiment, a user may use the telephone 1054 to initiate DMF network service 1058. Once DMF network service 1058 is initiated, it allows the user to use the services, such as reconfiguration of DMF. For example, when DMF 1052 needs to be reconfigured, DMF network services 1058 supplies a DMF web page and allows a user to select options from the DMF web page to configure DMF 1052. It should be noted that communication between DMF 1052 and DMF network service 1058 is carried out through the Internet 1056.

In another embodiment, a request for DMF network service 1058 from DMF 1052 can be initiated via a direct connection. A direct connection is a cable or a modem that is directly connected between DNS 1059 and DMF 1052. The Internet 1056 can be an alternative connection between DNS 1059 and DMF 1052.

PC 1050 can also be used to request DMF network service 1058 for DMF 1052. In one embodiment, DMF network service 1058 provides services directly to DMF 1052 after it receives the request. In another embodiment, DMF network service 1058 provides services to DMF 1052 through PC 1050. It should be noted that other methods of requesting DMF network service 1058 are possible, but they are not necessary to understanding the present invention.

Figure 11:
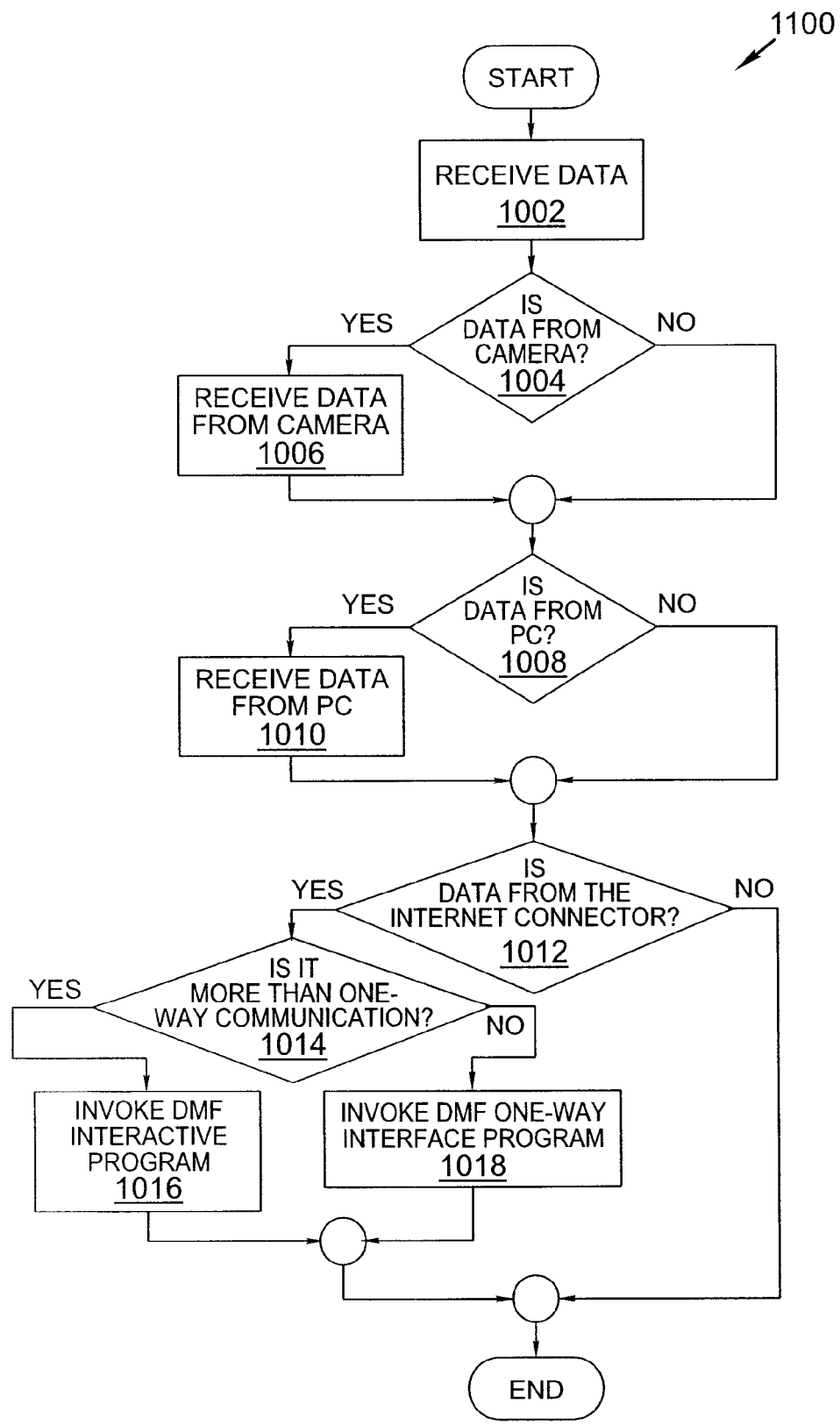
FIG. 11 is a flowchart illustrating an embodiment of receiving data from various devices.

FIG. 11 is a flowchart 1100 illustrating an embodiment of receiving data from various devices. The process begins at the start block and proceeds to block 1002 where the process receives data. At block 1004, the process examines whether the data comes from a camera. If block 1004 is false, the process proceeds to block 1008. However, if the block 1004 is true, which indicates that the data comes from the camera, the process receives the data using camera interface program at block 1006. Camera interface program includes, but not limited to, identifying types of protocol used to transmit the code from the camera and translating the code to native language if it is needed.

At block 1008, the process examines whether the data comes from a PC. If block 1008 is false, the process moves to the block 1002. On the other hand, if block 1008 is true, which indicates that the data comes from the PC, the process moves from block 1008 to block 1010 where the data is received. At block 1012, the process examines whether the data comes from Internet connector. If block 1012 is false, the process loops to the end block where the process ends.

However, if block 1012 is true, which indicates that the data comes from Internet connector, the process proceeds to block 1014 where the process examines whether the communication is a two-way communication. If it is a two-way communication, an interactive communication is possible. If block 1014 is false, which indicates that the communication is a one-way, the process moves to block 1018 where the DMF one-way procedure is invoked to receive the data. For example, a pager type of communication scheme is a typically type of one-way communication device and interactive communication is not permitted. After block 1018, the process moves to the end block where the process ends.

On the other hand, if block 1014 is true, which indicates that the communication is a two-way or more than one-way communication, the process moves to block 1016 where the process invokes the DMF two-way interactive program to handle the data. After block 1016, the process moves to the end block where the process ends.

Figure 12:
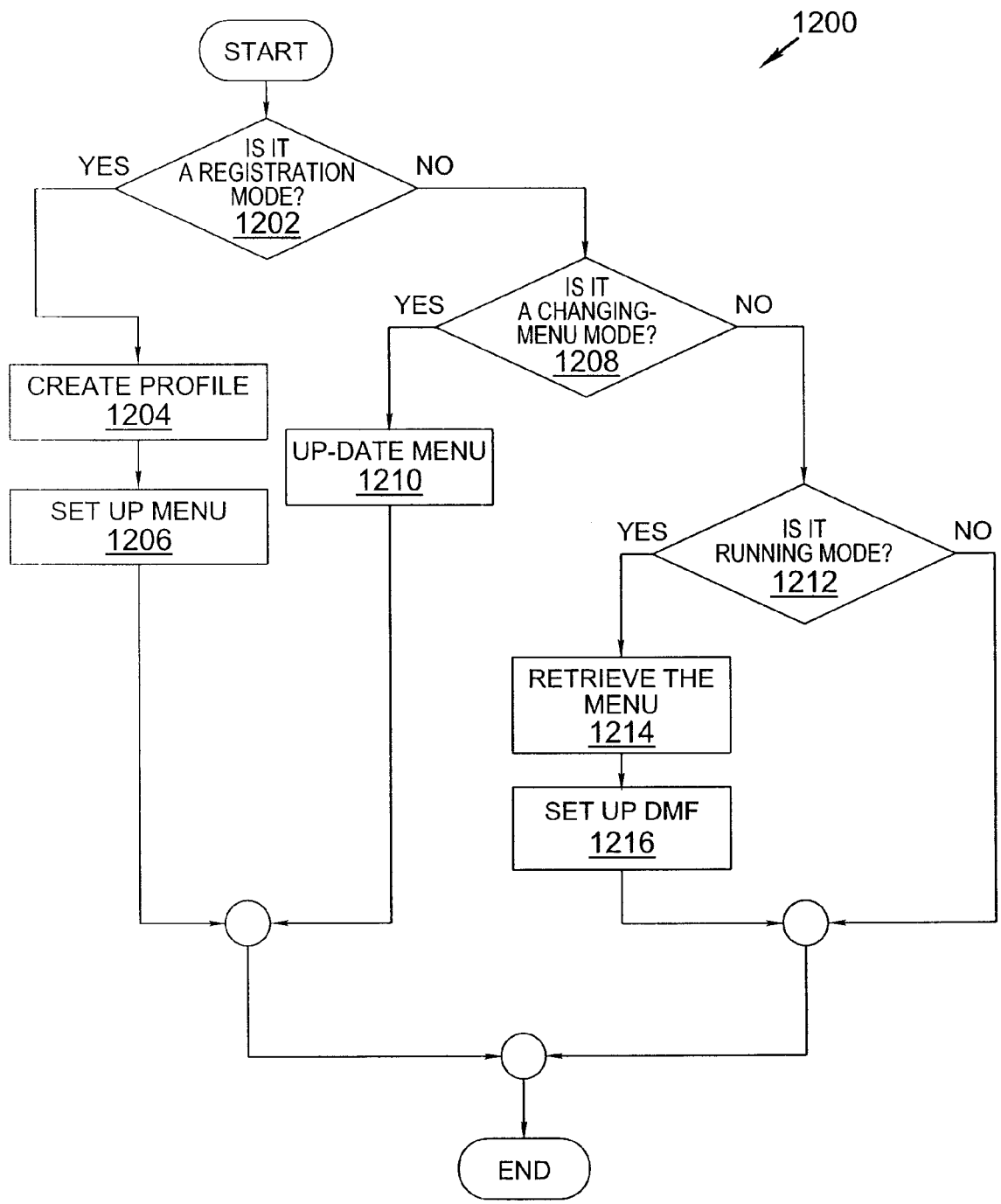
FIG. 12 is a flowchart illustrating an embodiment of different modes for a DMF.

FIG. 12 is a flowchart 1200 illustrating an embodiment of different modes for a DMF. Flowchart 1200 illustrates a registration mode, change menu mode, and running mode. The process begins at the start block and proceeds to block 1212 to examine whether it is a registration mode. If block 1212 is true, which indicates that it is a registration mode, the process proceeds from block 1212 to block 1214 where the process creates a user profile. After block 1204, the process moves to block 1206 where the process sets up the menu and stores the menu to the corresponding user profile. After block 1206, the process ends.

If block 1202 is false, which indicates that it is not a registration mode, the process moves from block 1202 to block 1208. At block 1208, the process examines whether it is a change menu mode. DMF contains a menu, which is used to configure DMF when DMF is used to display information under the information mode. If block 1208 is true, which indicates that it is a change menu mode, the process proceeds to block 1210 where the menu is updated.

If block 1208 is false, the process proceeds to block 1212 and examines whether it is a running mode. During the running mode, DMF fetches the menu from a corresponding user profile and configures the display screen according to the menu. If block 1212 is true, it indicates that it is a running mode, the process proceeds to block 1214. At block 1214, the process retrieves the menu from a corresponding user profile. At block 1216, the information mode of DMF is set up according to the menu. After block 1216, the process ends. If block 1212 is false, the process moves to the end block where the process ends. It should be noted that the flowchart 1200 may contain more than three modes.

Figure 13:
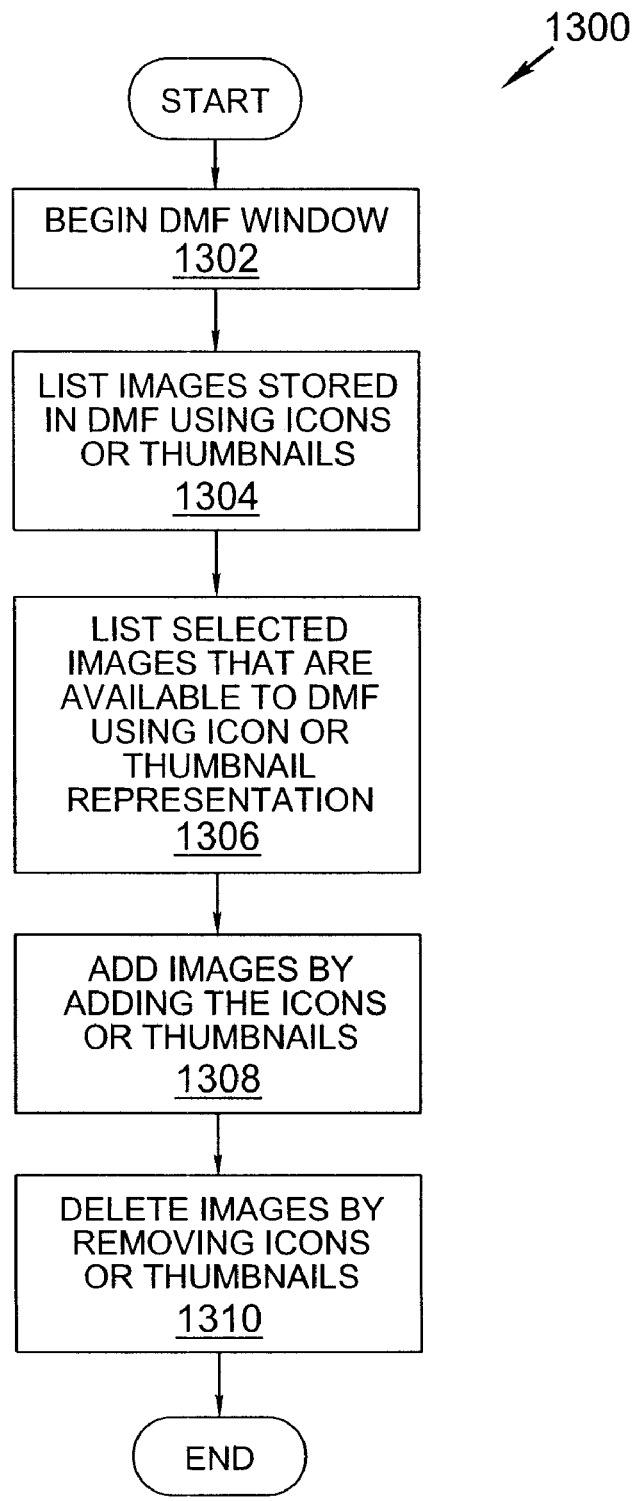
FIG. 13 is a flowchart illustrating an embodiment of DMF window for implementing image data.

FIG. 13 is a flowchart 1300 illustrating an embodiment of DMF window for data implementation. In one embodiment, DMF network service 1058 employs DMF Window to manage the user profile database. The process starts at the start block and proceeds to block 1302. At block 1302, the process begins DMF window. At block 1304, DMF window allocates a portion of screen identified as DMF storage and uses icons or thumbnails to list image files stored in DMF under the DMF storage. Thumbnail is a miniaturized picture that represents the image. At block 1306, DMF window further allocates a second portion of screen identified as global storage where various image files are listed using icons or thumbnails. In one embodiment, image files listed under the global storage are available to DMF.

At block 1308, DMF window allows a user to add an image to DMF by moving the corresponding icon or thumbnail from the global storage (one portion of screen) to the DMF storage (another portion of screen). For example, a user can click an icon and drag the icon from the portion of screen identified as the global storage to the portion of screen identified as the DMF storage. At block 1310, DMF window allows a user to delete an image from DMF by removing the corresponding icon or thumbnail from the DMF storage. For example, a user can click a thumbnail that represents the image to be deleted and drag the thumbnail to the trashcan.

Plural DMF Display Arrangements

Figure 14:
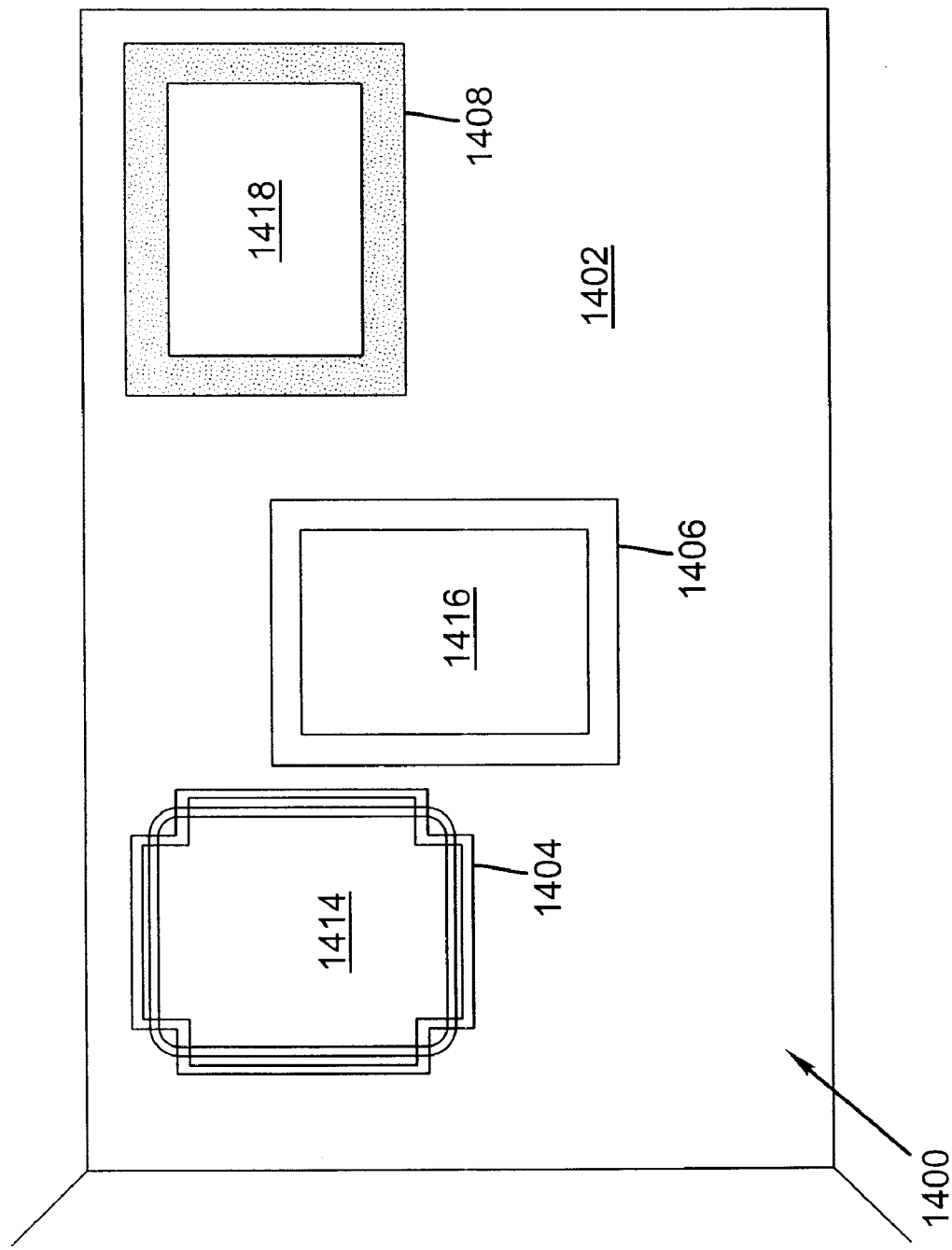
FIG. 14 illustrates a perspective view of a plurality of DMFs arranged on a common wall a room.
Figure 15:
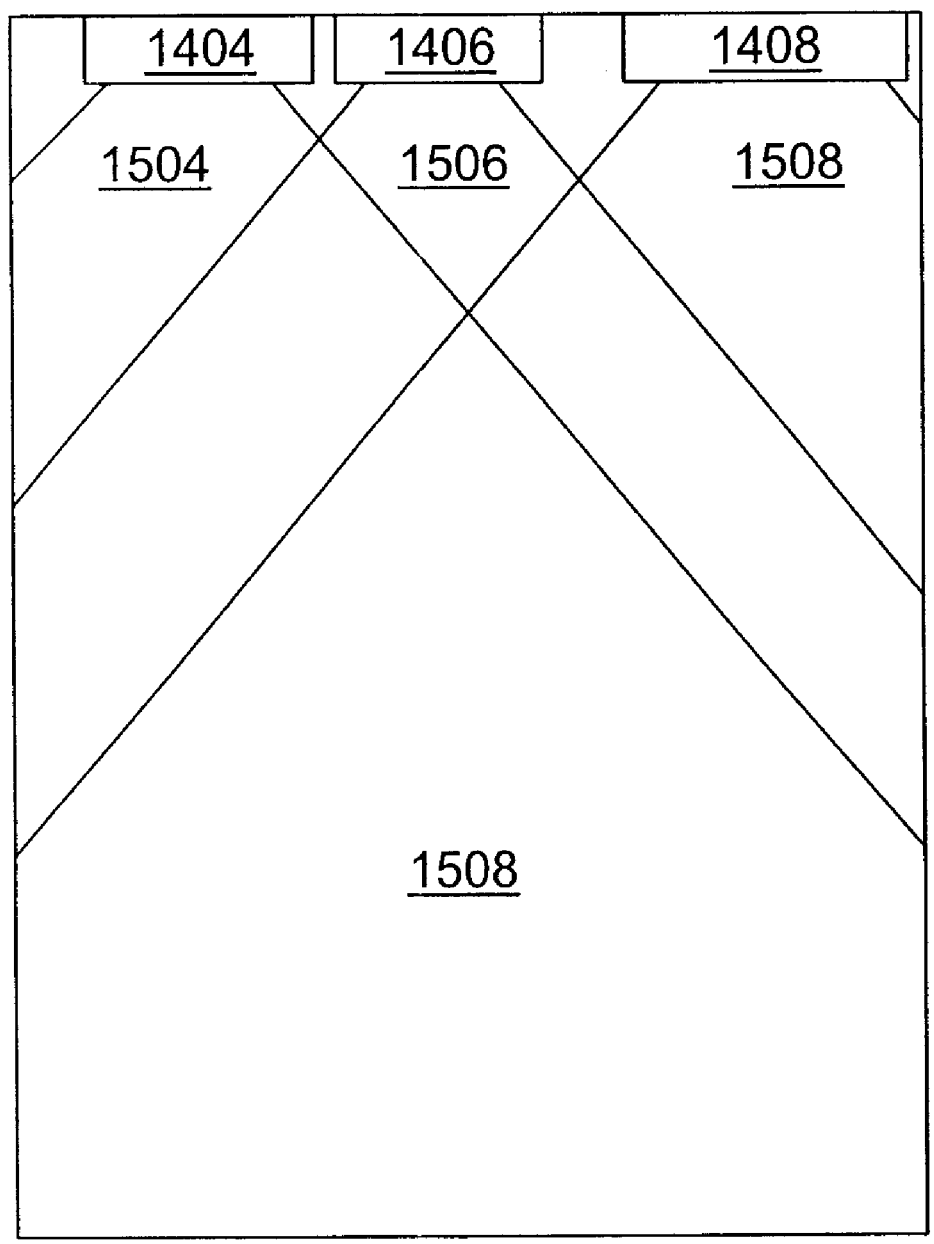
FIG. 15 illustrates a top down view of a plurality of DMFs arranged on a common wall a room.

As is illustrated in FIGS. 14 and 15 a plurality of DMFs 20a-20 can be provided in a single area such as a room 1402. In the embodiment of FIGS. 14 and 15, DMFs 1404, 1406 and 1408 are arranged on a common wall 1404 of room 1402. As is further illustrated in FIGS. 14 and 15, DMFs 1404, 1406 and 1408 each present image content in the form of image modulated light that emanates from display devices 1414, 1416 and 1418 associated with DMFs 1404, 1406 and 1408 respectively and that radiates within a presentation zones 1424, 1426 and 1428 so that the images presented by display devices 1414, 1416 and 1418 are viewable within room 1402

Presentation zones 1424, 1426 and 1428 overlap and in areas where all of the presentation zones 1424, 1426 and 1428 overlap image content from all of DMFs 1404, 1406 and 1408 can be seen. Such a region of overlap is referred to herein as a presentation space 1500.

In the arrangement illustrated in FIGS. 14 and 15, two criteria principally define the extent of presentation space 1500, the orientation of each display device of each DMF and the shape of presentation area provided by each of DMFs 1404, 1406 and 1408.

Figure 16:
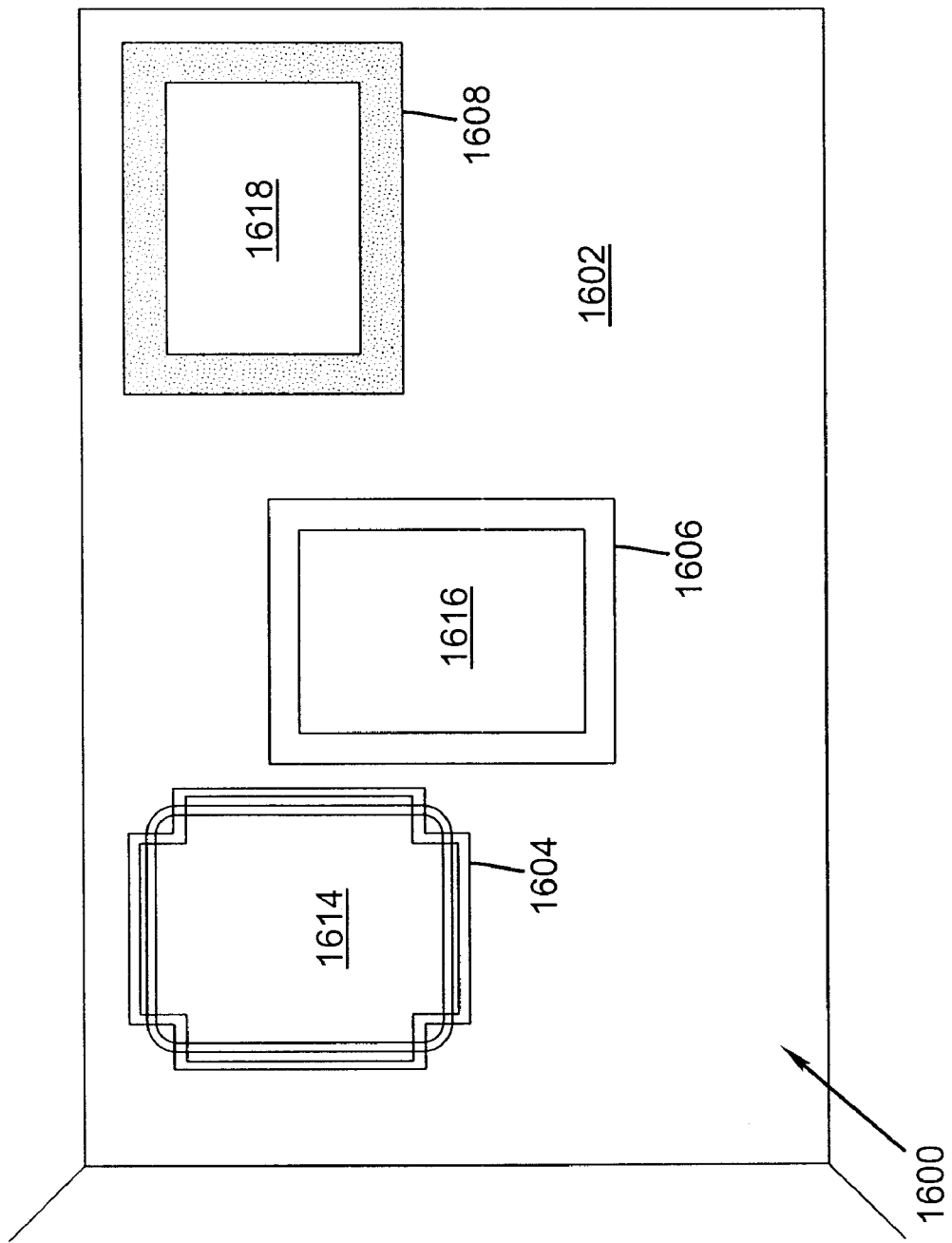
FIG. 16 illustrates a perspective view of a plurality of DMFs arranged with two DMFs on a common wall and one DMF positioned away from the wall.
Figure 17:
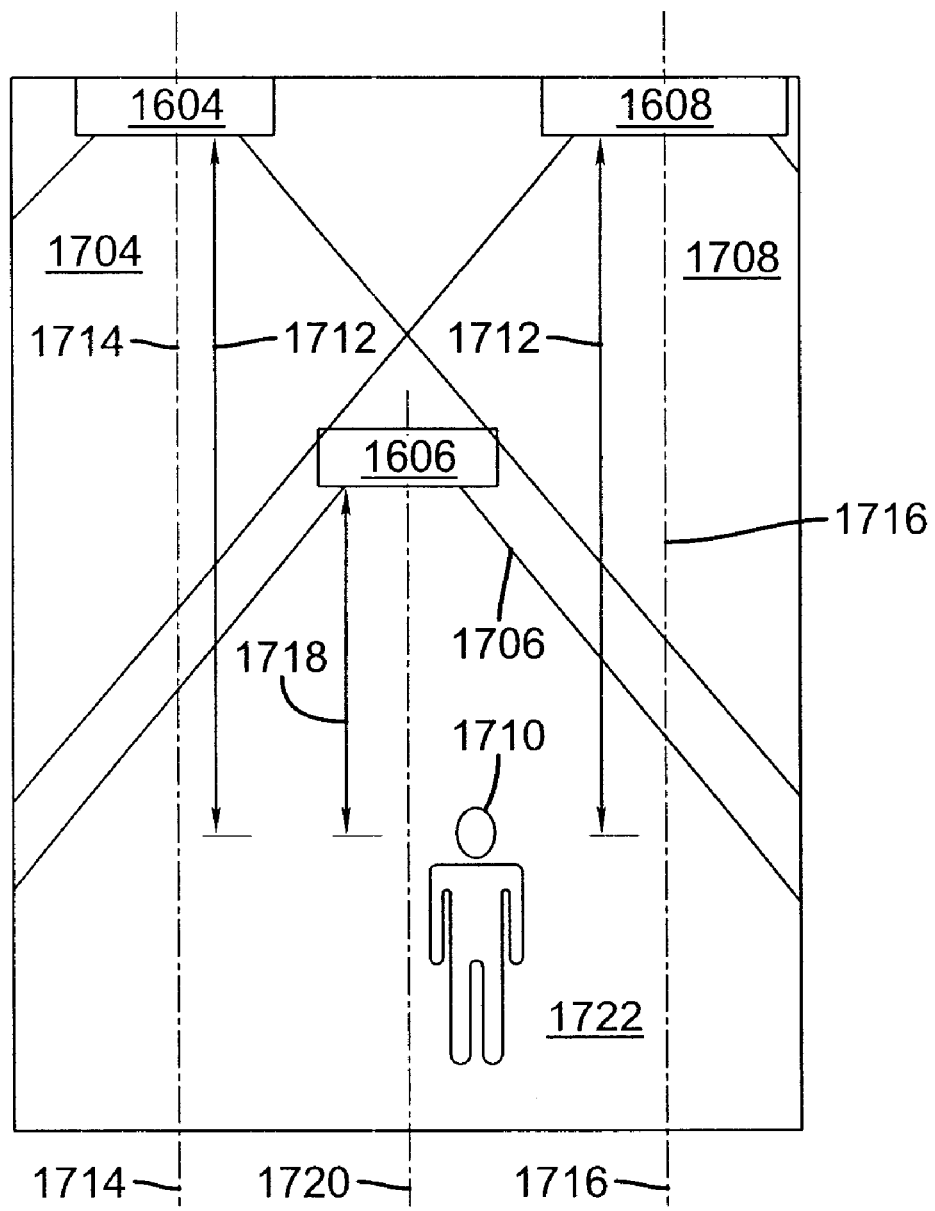
FIG. 17 illustrates a top down view of a plurality of DMFs arranged with two DMFs on a common wall and one DMF positioned away from the wall.

In the arrangement illustrated in FIGS. 16 and 17 a further issue related to defining a presentation space is illustrated, specifically, it will be appreciated that the presentation zone of a display is a function of both of the rate of propagation of the image modulated light from DMFs 1604, 1606 and 1608 and the propagation distance 1704, 1706 and 1708 from each display. As is illustrated in these figures, DMFs 1604 and 1608 are separated from a person 1710 by a first distance 1712 along projection axes 1714 and 1716 while DMF 1606 is separated from person 1710 by a second distance 1718 along a projection axis 1720 that is smaller than the first distance 1712. Accordingly, the region of overlap and thus presentation space 1722 is limited by the lesser extent of propagation of light from DMF 1606.

It will be appreciated from this that in managing the presentation of content across multiple it is necessary to have at least a two dimensional understanding of the distribution of the DMFs used to present the content and preferably a three-dimensional understanding of the position of the DMFs that will be used to present visual content in the presentation space.

System Set-Up

Figure 18:
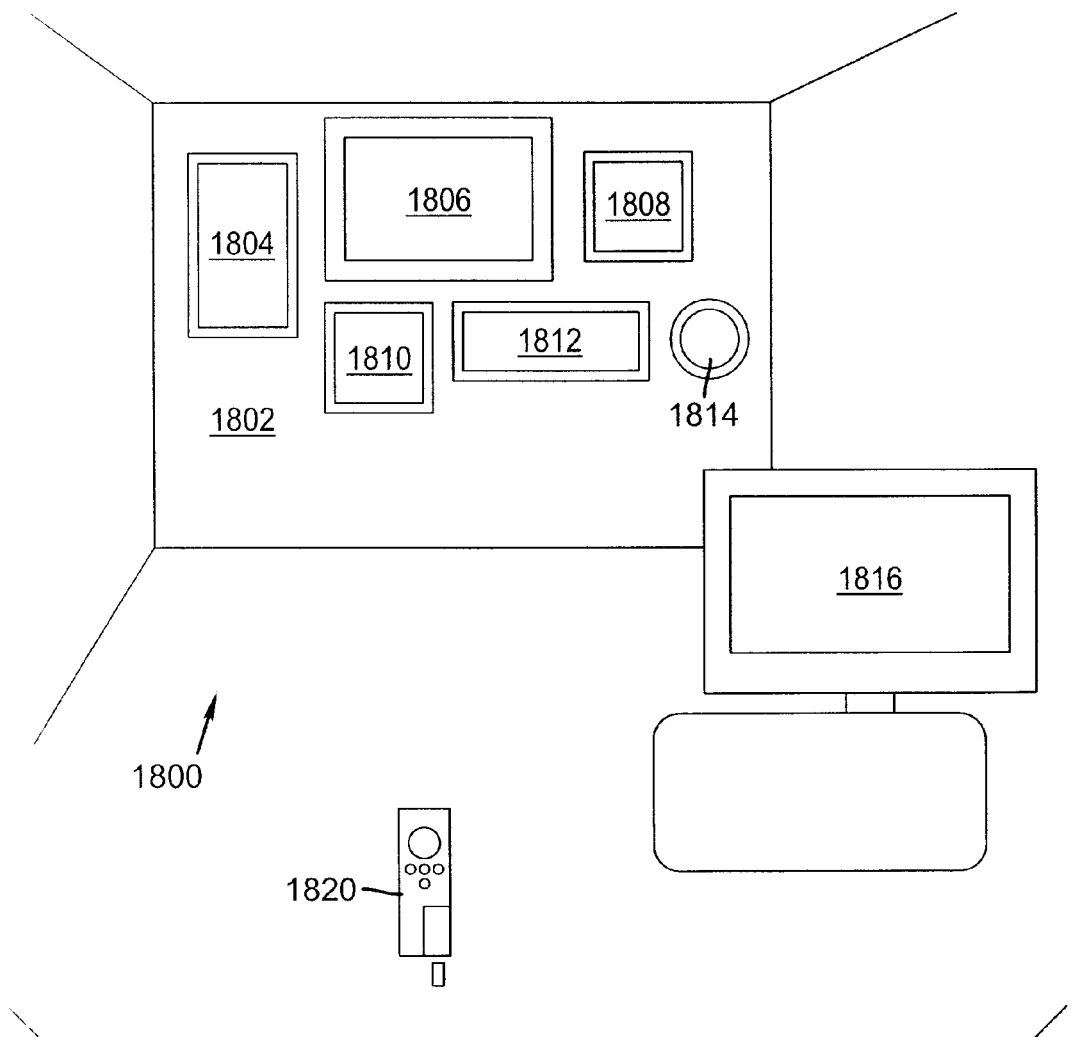
FIG. 18 shows a perspective view of one distribution of DMFs in a room to provide a presentation space.

FIG. 18 shows a perspective view of one distribution of DMFs in a room to provide a presentation space. There are a variety of ways in which positional information can be obtained for DMFs 1802-1814. In the embodiment of FIG. 18, DMFs 1802-1814 are arranged in a room 1800 in a free standing manner that is, there are no fixed locations for DMFs 1802-1814.

In such an embodiment the location of and number of DMFs 1802-1814 available for presentation of visual content in presentation space 1820 can be determined in such a situation using a variety of different approaches, some of which are discussed in U.S. Pat. No. 7,091,926 which involves determining a location of a plurality of different display screens to form a generally continuous display area to provide a surround type visual experience.

In general the '926 patent notes that screen positions can be predetermined, designated, or sensed. Sensing can include using remote sensing devices such as acoustic, radio-frequency, infrared, or other sensing systems. For example, a user can indicate three points of a screen's perimeter by placing an infrared emitter on each of the points. A computer system is informed of each point by, e.g., a user keypress at or near the time of emitter placing. Once three points, such as three corners of a display screen, are known, the three-dimensional position of the screen, along with the screen dimensions, can be determined.

Sensing can also be performed using digital photography techniques, in that it will be appreciated that a digital image can be captured of the arrangement of DMFs 1804-1814 from a position within presentation space 1820. Such a digital image can be analyzed to identify objects in the presentation space that are potentially DMFs, for example such image analysis can be performed by searching for a background pattern—the wall, and then looking for interruptions in the background area having sizes, shapes, aspect ratios or other image conditions that are indicative of display devices.

In one approach the DMFs 1804-1814 can be operated in a mode wherein they present identifying information on their respective display units 1834-1844 and also present indicia indicating the parameters of the display units. Such identifying information and display parameters can be presented in a bright color such as a yellow, red or white. This type of setup mode can be captured with a portable video capture device with the video feed providing feed back to the control circuitry in real time as the system cycles through DMFs 1804-1814. Thus, the pattern and the location of each individual DMF within the pattern are determined. This portable video capture device could be within the remote control of the system of DMFs.

As is also noted in the '926 patent, three dimensional sensing can be by any means as is known in the art. For example, laser scanning, coordinate measuring machines, etc. can be used along with triangulation techniques to identify positions. Another approach is to use global positioning system (GPS) sensing. Other alternatives include angulation using phased antenna arrays, imaging using one or multiple cameras and scene analysis, etc.

Another type of sensing is mechanical sensing. This can use a movable arm located at a known point where the end of the arm is touched (or moved near) to one or more points of a screen. Joints or hinges can be affixed at places where screens are adjacent. Such joints can measure the angles made by the planes of the adjacent screens so that positions of secondary screens relative to a main screen can be determined. This is usually sufficient to determine accurate positions of the secondary screens. Sizes of the screens can be manually input by the user so that presentation software can compute only the views, and viewport sizes, necessary to create information to be displayed on each of the screens. Such sensing joints can be made strong enough to hold and support multiple screens. An example of such a joint is described, below.

Another setup procedure can include a menu of patterns that the screens will make up. A pattern menu can be available over a network or simply in a user manual. Once a pattern is determined, each DMF will have an assigned location within the pattern. An embodiment of the invention could include two rotating wheels that on the back of each DMF. Each wheel can represent a menu of bit codes that can be labeled pattern number and frame number. A user can simply rotate the wheel to the desired pattern number, on the back of each DMF. Furthermore, the user determines which DMF number corresponds to the placement within the pattern, thusly rotating the wheel on the back of the frame marked frame number. This process is repeated until all frames are numbered associated with their placement location assignment.

One useful way to determine positions of screens is simply to ask a user to input the positions. This manual position designating includes having a user make measurements of distances and angles which are then entered into a computer system that calculates the screen positions from the measurements. The user measurements can be rough approximations and screen positions can still be determined with enough accuracy to create a coherent multi-screen display.

Screen positions can be calibrated. One form of calibration allows a user to move models of screens on a computer display. Each screen model corresponds to an actual screen that the user is viewing. The model positions are used to generate views for the screens as the user is moving a model. When the user sees matching views of a scene, test pattern, reference object, etc., among screens that include the model screen being moved, then calibration is achieved. The user indicates to a computer system that the current model position results in a view that is coherent with another screen (e.g., the main screen) and the computer system can then use the information to generate further views for the screen corresponding to the model.

Screen positions can be predetermined. For example, a presentation program may have default, or optimal, screen placements determined by a program, or presentation, author. In this case, the user is directed to place the screens in a predetermined orientation. It is possible that an automated system can move the screens without user intervention.

Figure 21:
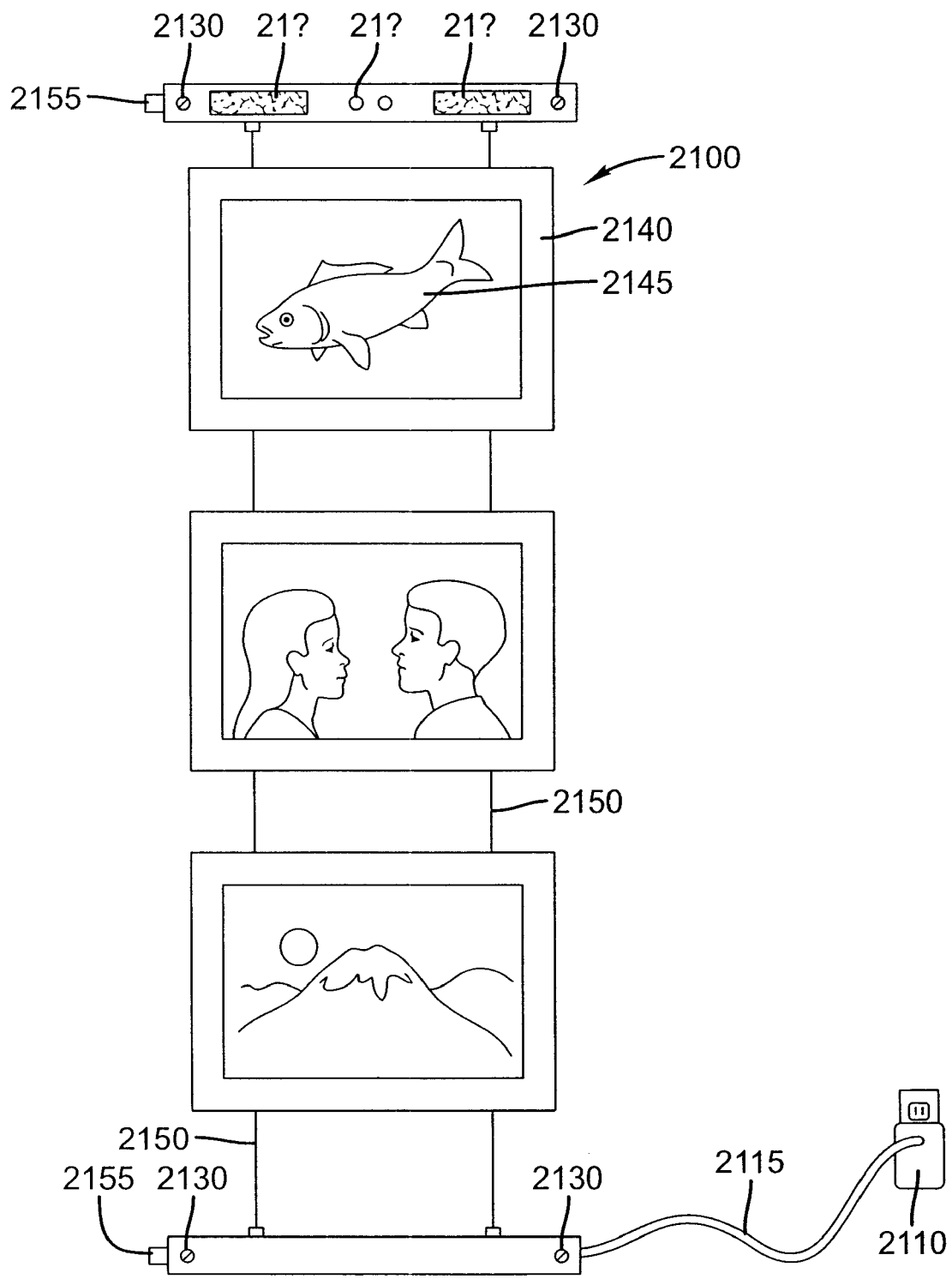
FIG. 21 is a front view of a power cable mounted embodiment of a DMF array.
Figure 22:
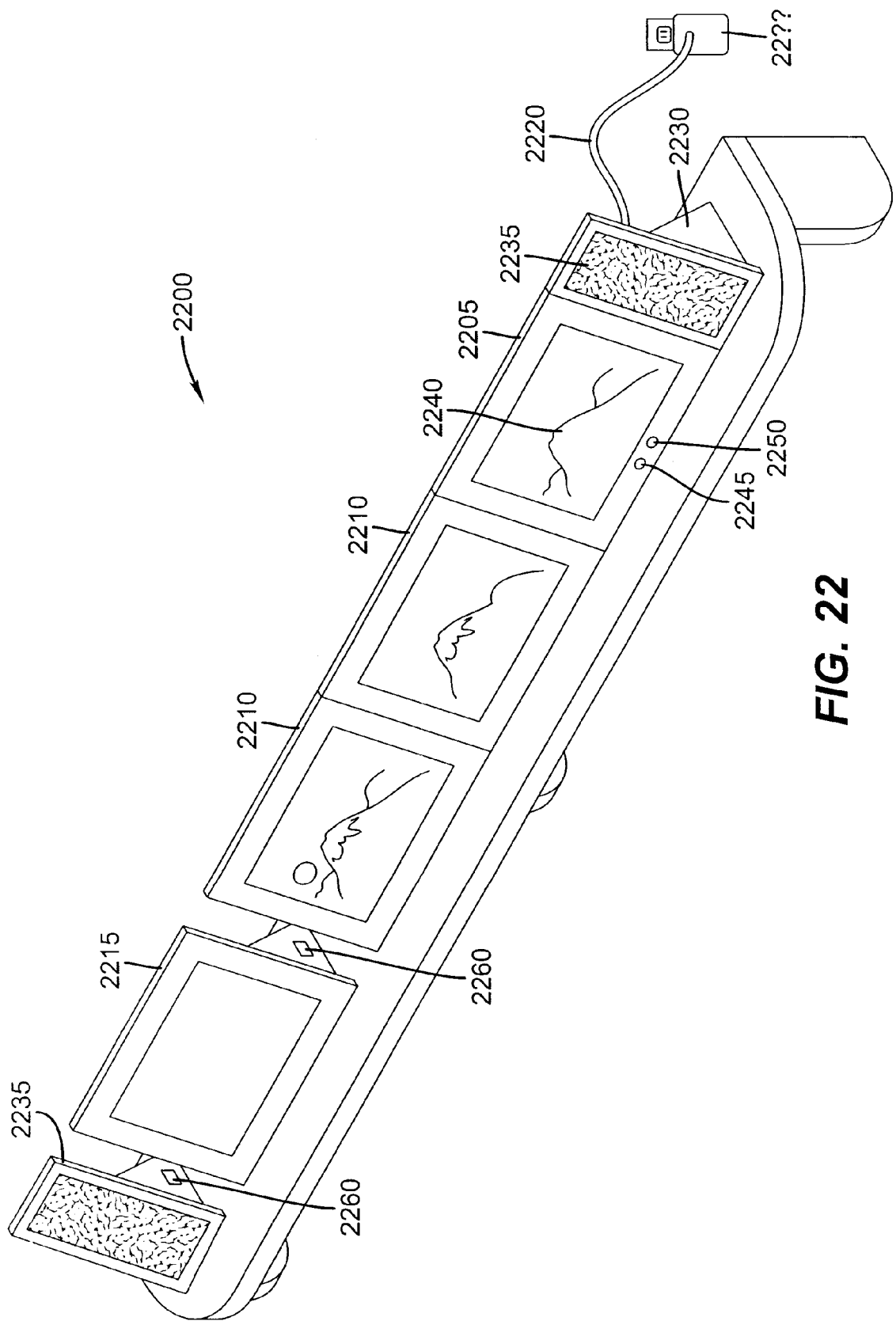
FIG. 22 is a perspective view of a modular interlocking DMFs forming an array.
Figure 23:
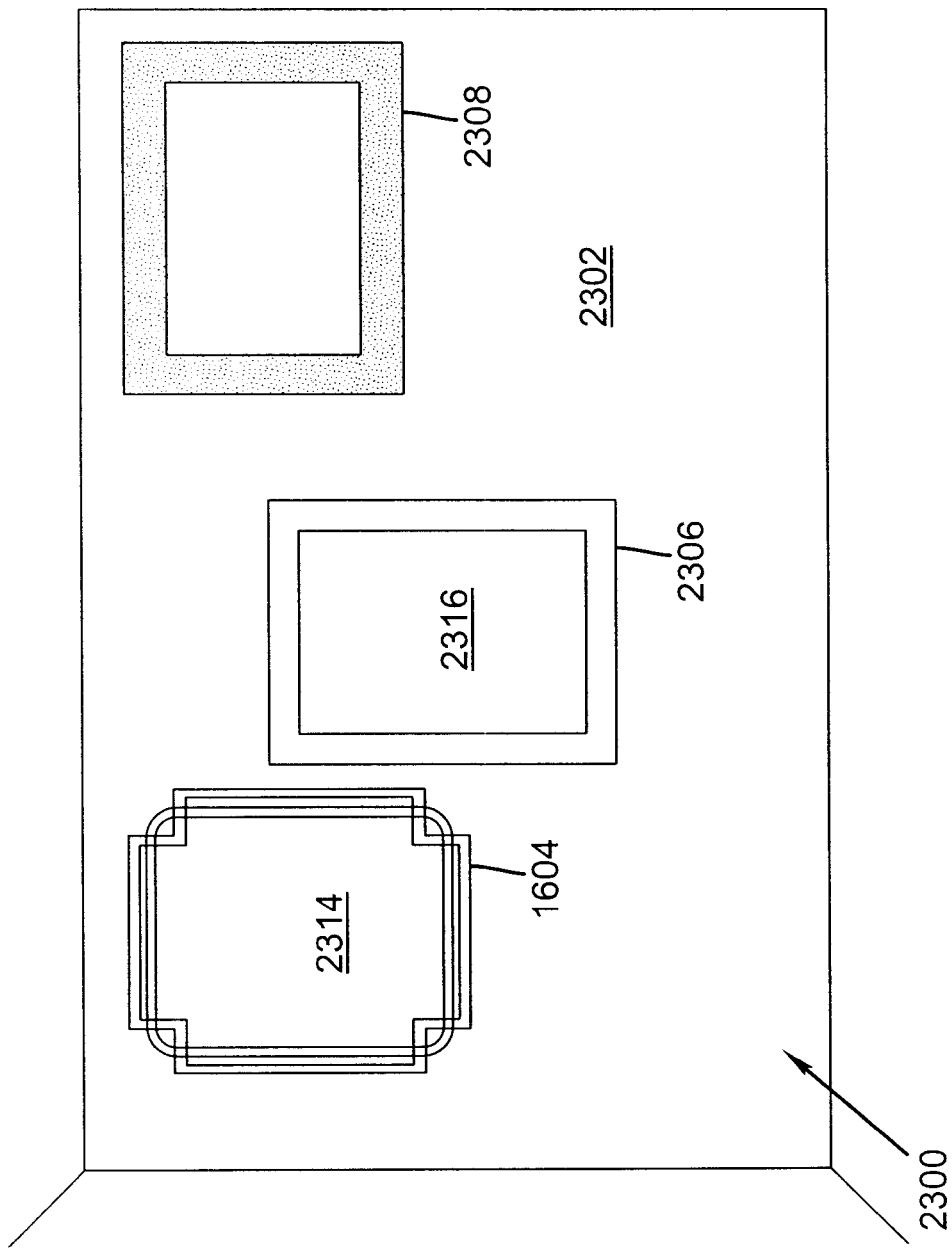
FIG. 23 shows a perspective view of a room having an arrangement of DFMs therein.

For example as illustrated in FIG. 23 DMFs can be supported by movable support systems, including but not limited to cable based systems (as shown in FIG. 21), DMFs can also be on pivoting platforms, moveable robotic arms, on moveable robotic arms or rope and pulley systems, etc.

DMF Arrays

Figure 19A:
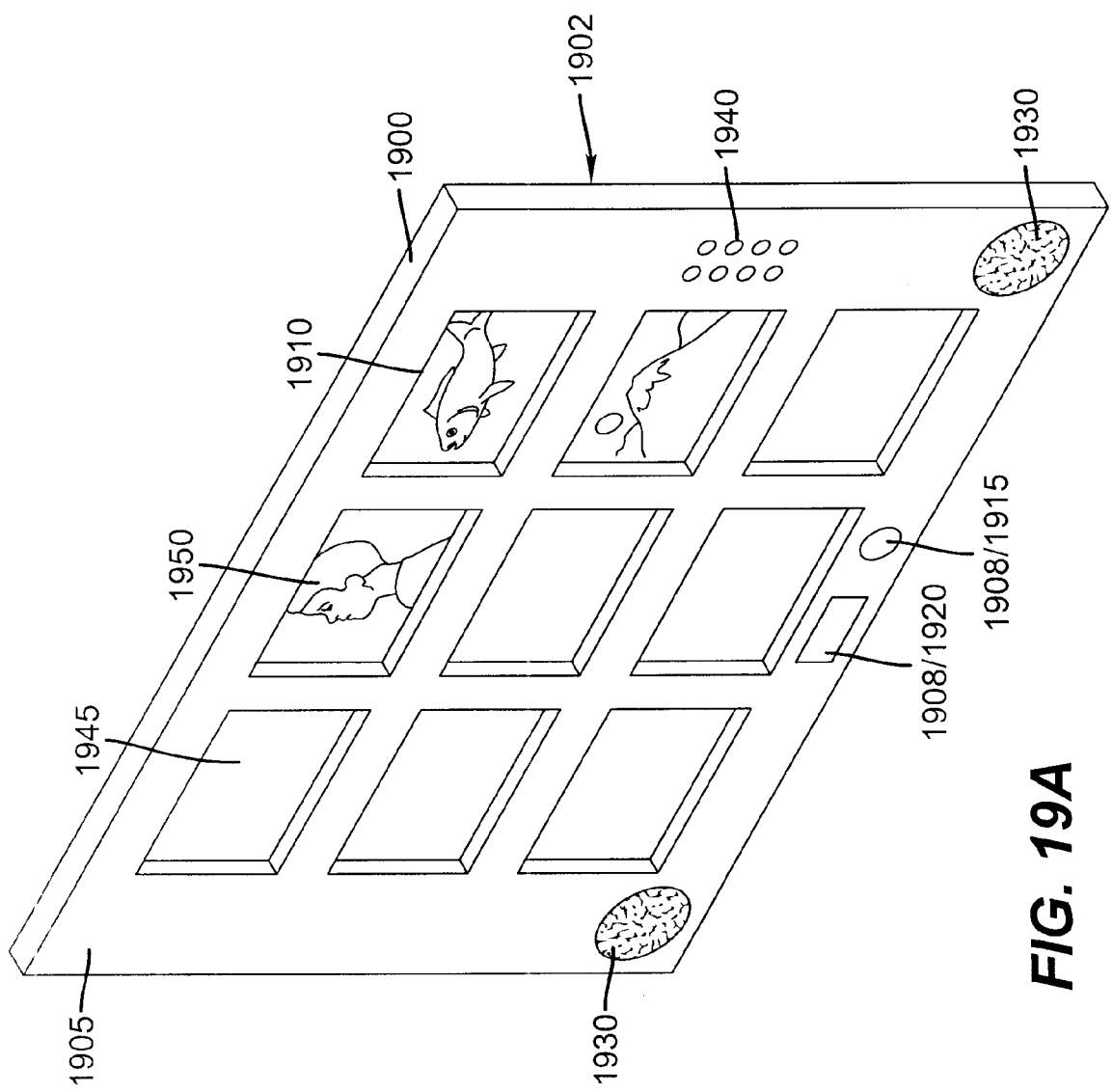
FIG. 19A is a front perspective view of a DMF array.

Turning now to FIG. 19A, what is shown is a front perspective view of a digital media frame array 1900. As is shown in FIG. 19A, digital media frame array 1900 comprises an array structure 1902 positioning a plurality of digital media frame supports 1904 to define at least a two dimensional arrangement of the plurality of DMFs 1910. In the embodiment illustrated in FIG. 19A, digital media frame supports 1904 are illustrated generally as a recessed areas within an generally rigid array structure 1902 and each are arranged to receive one DMF 1910. However, in other embodiments, supports 1904 can take on different shapes and can be adapted to support DMFs in other ways. Further, it will be appreciated that in various embodiments DMF supports 1904 can be adapted to support more than one DMF 1910. DMFs 1910 of digital media frame array 1900 can include media frames of various sizes, shapes, and aspect ratios and can be modularly assembled to digital media frame array 1900.

In this embodiment, DMFs 1910 are placed in supports 1902 that such that they are arranged along a front surface 1914 of the digital media frame array support 1902.

Figure 19B:
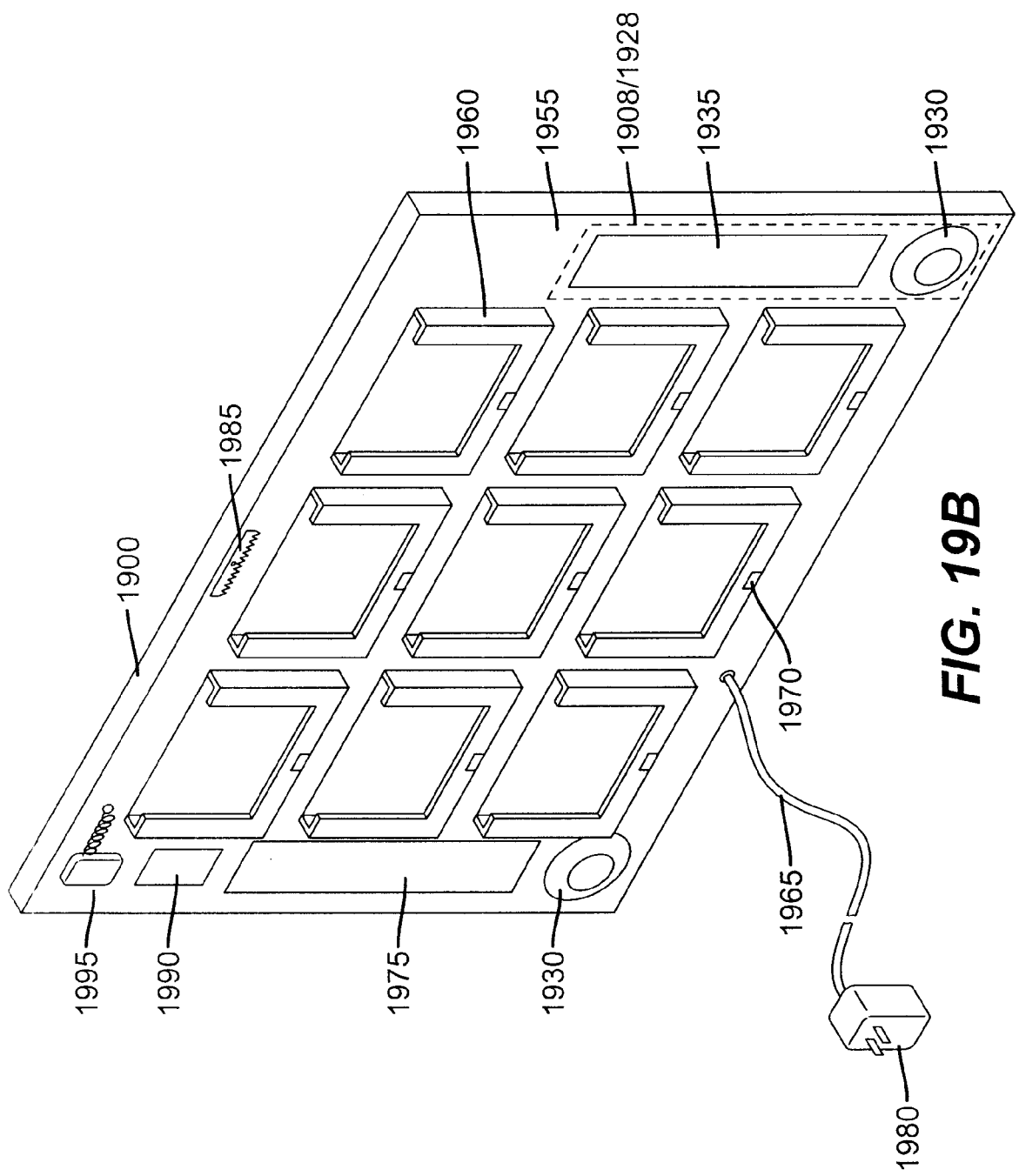
FIG. 19B is a rear perspective view of a DMF array.

FIG. 19B illustrates a rear perspective view of the embodiment of digital media frame array 1900 illustrated in FIG. 19A. As is shown in FIG. 19B, array support 1902 provides a rear surface 1955 on which a series of individual display holders 1960 are mounted, joined or integrally formed. Power cord 1965 attached wall power supply 1980 provides power to the individual displays 1910 via array interface 1970 which can be of the type such as a Universal Serial Bus (USB) or equivalent such that both power. Data lines 1972 can be provided to each connector 1970 so that data can be conveniently conveyed to DMFs 1910. This can be done using the USB standard which integrates both power supply and data connections in a single wiring standard. Other arrangements for providing data communication and/or power to DMFs 1910 can be provided including the use of a wide variety of other wired, optical and wireless communications.

As is illustrated in FIG. 19B, data lines 1972 converge at an array controller 1975. In the embodiment illustrated, array controller 1975 is adapted to cause the array interface 1970 to communicate with one of the DMFs 1910 so that the array controller can cooperate with a processor (e.g. processing circuit 236, processing unit 326) for the DMF 1901. This data communication between the array controller 1975 can be used for a variety of purposes. In particular, this allows the array to provide active systems and sub systems that can cooperate with one or more DMF 1910 supported by digital media frame array 1900. In particular as shown, digital media frame array 1900 has a plurality of different array interaction systems 1908 that so that when digital media frame 1910 is supported by the digital medium frame array 1900, combination can interact with their environment in ways that the digital medium frame 1910 cannot do when not so supported.

As is shown in FIG. 19A, a transparent touch sensitive screen overlay 1940 can be provided to form a touch screen that provides signals to array controller 1975 indicating when and where contact has been made with the touch sensitive surface and wherein array controller 1975 determines data for transmission to a processor for a DFM 1910 that has a display that is located at a position that corresponds to the point of contact. Such a touch screen overlay 1940 for set up and used for a variety of purposes including but not limited to selecting semantic type "play lists", along with the ability for the user to manually manipulate and navigate the image collection. Digital Image 1950 produced by individual media frame 1910 is visible through individual display Matte opening 1945.

Another example of such an array interaction system shown in FIG. 19A is a proximity sensor 1925 which a presence sensor adapted to sense the presence of a person relative to the array and wherein the array controller causes the array interface to transmits signals to the processor from which the processor can determine whether to suspend image presentation. This arrangement can be used to alert the DMFs 1910 as to the presence or absence of a user in a presentation space in order to conserve power when no user is present.

In still another example, array interaction system can comprise an audio system 1928 illustrated in both FIGS. 19A and 19B. Audio system 1928 is adapted to generate audio signals based upon digital audio data provided by the array controller 1975. The array controller in turn cooperates with the processor of the DMF 1910 to obtain the digital audio data. This can be done by downloading audio data from the DMF 1910 or by obtaining from the DMF 1910 and address of a location that the audio data can be obtained and can be directly connected to a network such as the internet from which such audio data can be obtained or to a device having access to such audio data. In the embodiment illustrated, audio system 1928 comprises audio speakers 1930 powered by audio amplifier 1935 are user to play audio data associated with the visual presentation.

Figure 19C:
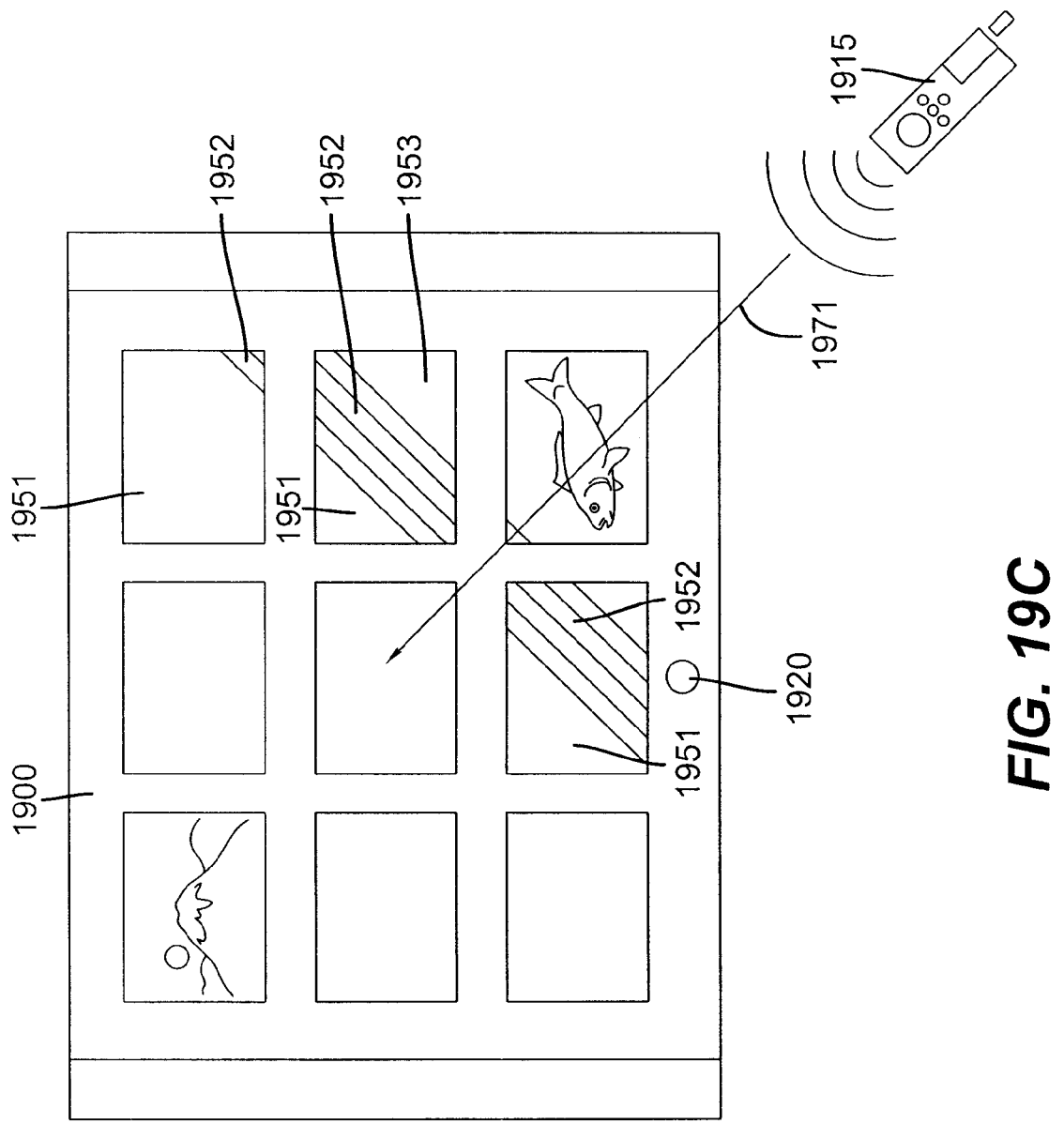
FIGS. 19C and 19D, show another embodiment of an array interaction system having a remote data signal interface.
Figure 19D:
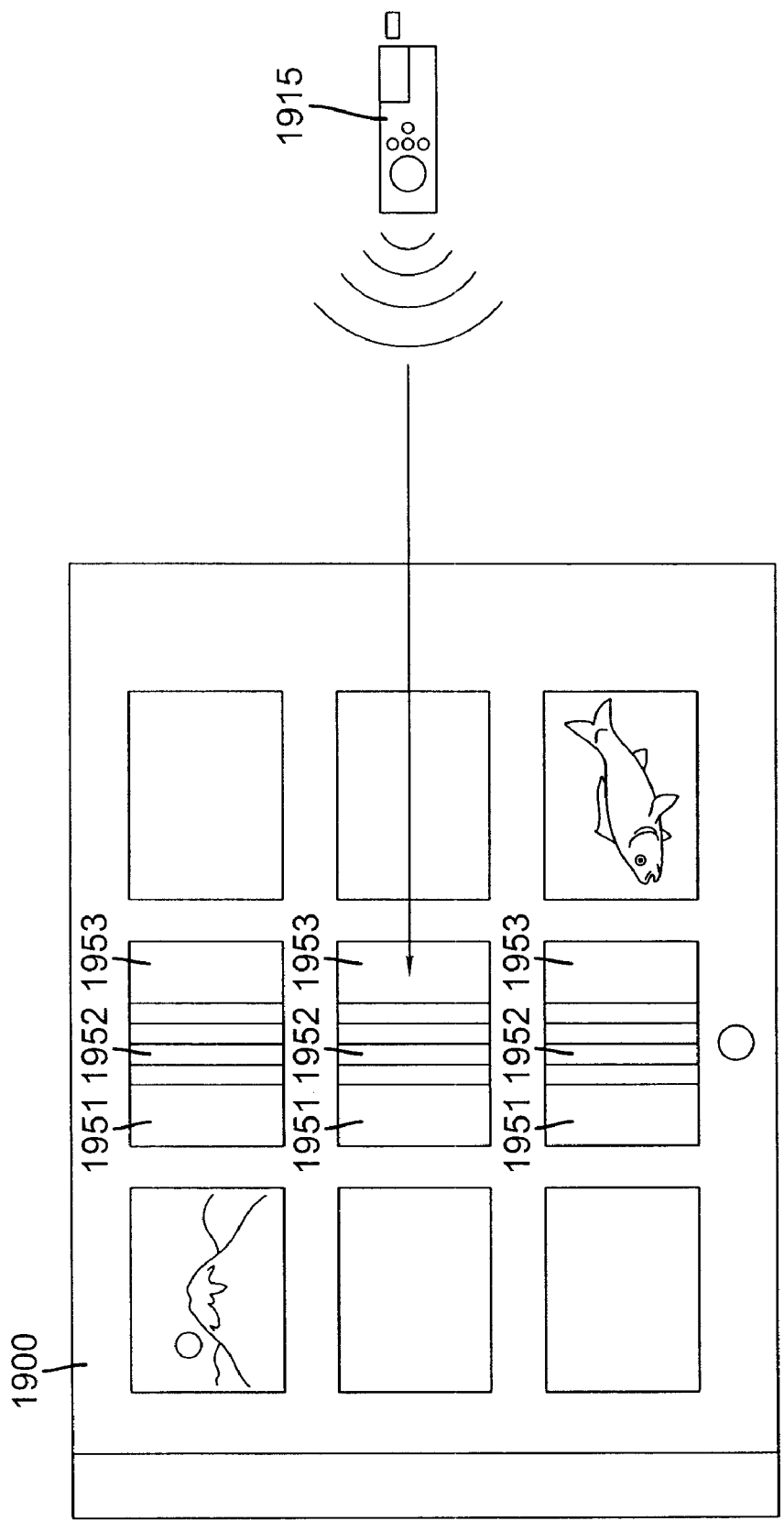

FIGS. 19C and 19D, show another embodiment of an array interaction system 1908 having a remote data signal interface 1920. Remote data signal interface 1920 is used to communicate with other remote devices such as a remote control unit, digital camera, cell phone or the like. Array controller 1975 the array controller causes the array interface to transmit signals to the processor based upon the signals received from the remote device. Such signals can include image data and instruction data.

Remote data signal interface 1920 can be of a type that cannot detect a direction from which the signals were sent relative to the array and can be of a type that can detect such a direction. A wide variety of known structures are capable of doing this, including but not limited to hard radio frequency triangulation systems, directional optical sensors.

As is illustrated in FIG. 19C when such directional information is available, display system 1900 with remote control interface 1920 controlled by remote control 1915. Based on the position of the remote control 1915 relative to display system 1900 the controller (not show) interprets the relative positions of the device as a vector direction, which it uses to provide a vector direction for digital image transitions. As illustrated in FIG. 19C initial images 1951 are transitionally replaced by subsequent image 1953 along the vector determined transition 1952. This would allow a determination of a vector path 1971 between the remote control 1915 and the display system 1900 or the sensors used to detect remote control signals with the vector path guiding the flow of image transitions by positioning and would provide an intuitive indication of a source of a new set of digital images.

FIG. 19D illustrates an alternative position for remote control 1915 relative to display 1900. In this example the remote control 1915 is positioned by the user at the center of the right edge of display system 1900 and pointing horizontally and to the left establishing vector path 1973. Now initial images 1951 are replaces by image transitions 1952 and subsequent images 1953.

In other embodiments, array controller 1975 can enable the sharing of other resources with DFM 1975 that have the effect of altering the ability of the DFM 1976 to provide environmental stimulus or to receive environmental stimulus.

For example, array controller 1975 can provide a shared memory for the DFMs 1910 supported by DFM array 1975. In such an embodiment, the array interaction system comprises a memory buffer system to provide additional memory capacity as necessary to enable specific memory intensive forms of environmental interaction such as audio or video presentations to be made. Such a memory buffer may be removable and/or remotely updateable display via a wireless data transfer modality using wireless communication transceiver 1995 and managed by controller and processor 1990. In another embodiment the array interaction system can comprise a supplemental processing system to provide additional processing capacity to the processor as necessary to enable specific processing intensive forms of environmental interaction including but not limited to audio and video presentations.

As is also shown in the embodiment of FIG. 19B, a mount for wall attachment 1985 is used to mount the digital media frame array 1900 to vertical surfaces like conventionally mounted photographic frames, mirrors, flat art and the like via a robust hanging device such as a picture hanger.

It will be appreciated that where a digital media frame array is used that has fixed supports to receive DFMs 1910 and that also provides independent data cables and connectors for data communication between array controller 1975 and DFM 1910, array controller 1975 can be adapted to determine which of the plurality of digital medium frames is supported by which of plurality of supports, and can use this determination to further automatically determine relative positions for the DFMs 1910. It will be appreciated that such a digital media frame array can take any of a variety of forms and can position the digital media frames 1910 in a plurality of different orientations including positions are separated from each other along three dimensions.

Figure 20:
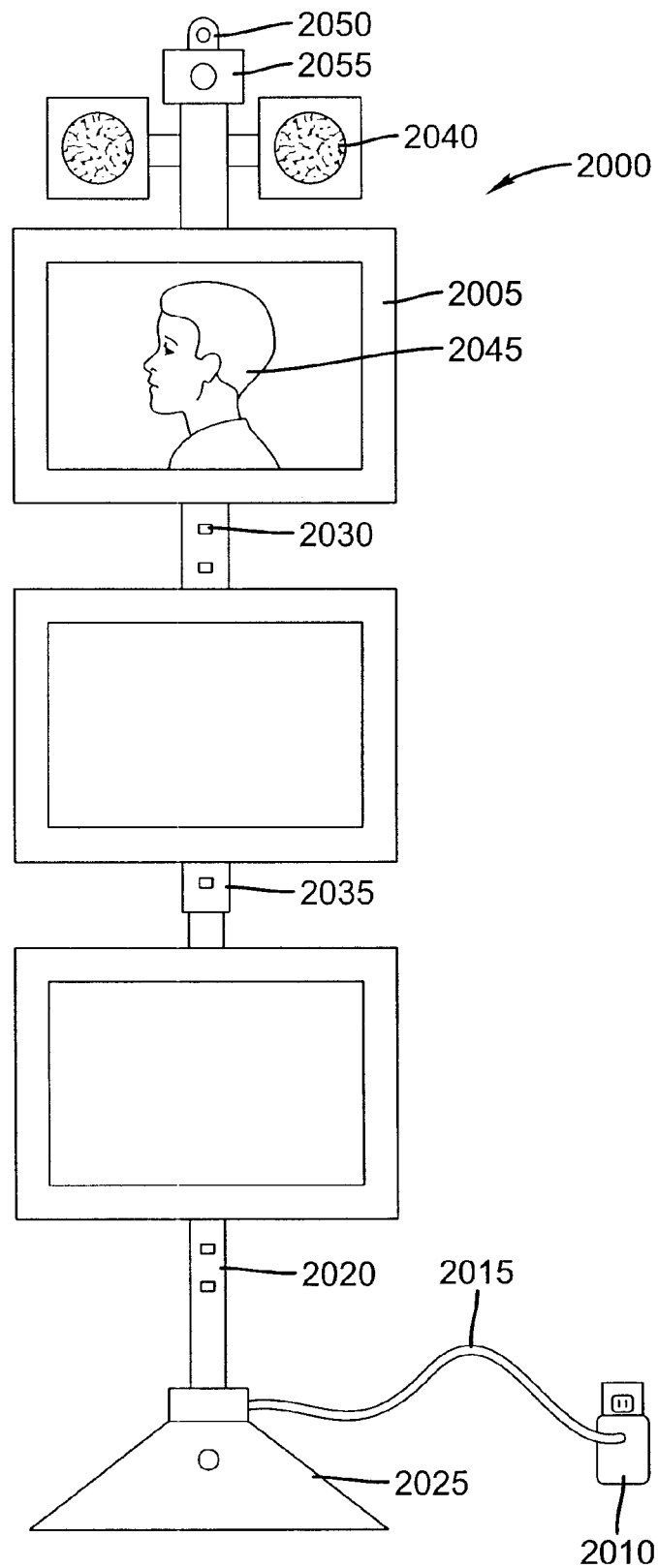
FIG. 20 is a front view a stanchion mounted embodiment of a DMF array.

Referring to FIG. 20 what is shown is a stanchion mounted display system, which provides mount for the digital media frame cluster 2000 including individual displays of digital media frame array 2005.

Power is provided to the digital media frame cluster 2000 by the wall power supply 2010 via power cord 2015, which is connected to the support base and electronics housing 2025. Individual display mount and data interface 2030 are provided along the length of support stanchion 2035 and are used to mechanically attach individual displays of digital media frame array 2005 via a hook, not shown, and provide them with power and data which can be of the type such as a Universal Serial Bus (USB) or equivalent.

Stanchion 2035 may be in a two part telescoping assembly and spring or pneumatically loaded to cause the telescoping sections expand outward to provide secure pressure mounting between a typical floor and ceiling without damaging or modifying either surface. Support base and electronics housing 2025 is inclusive of; remote data signal interface, individual display data power interface, shared memory for the display array, display controller and processor, and wireless communication transceiver, all not shown. Audio speaker and Audio amplifier 2040 are provided in a unitary housing that uses the same individual display mount and data interface 2030 to provide attachment to station 2035 and data and power. Digital Image 2045 is presented on individual display of digital media frame array 2005. Remote data signal interface 2055 is used to communicate with other controlling devices such as a remote control unit, digital camera, cell phone or the like. Proximity sensor 2050 is optionally used to alert the unit to the presence of a user in order to conserve power when no user is present.

Selecting Visual Content for Presentation

Figure 24:
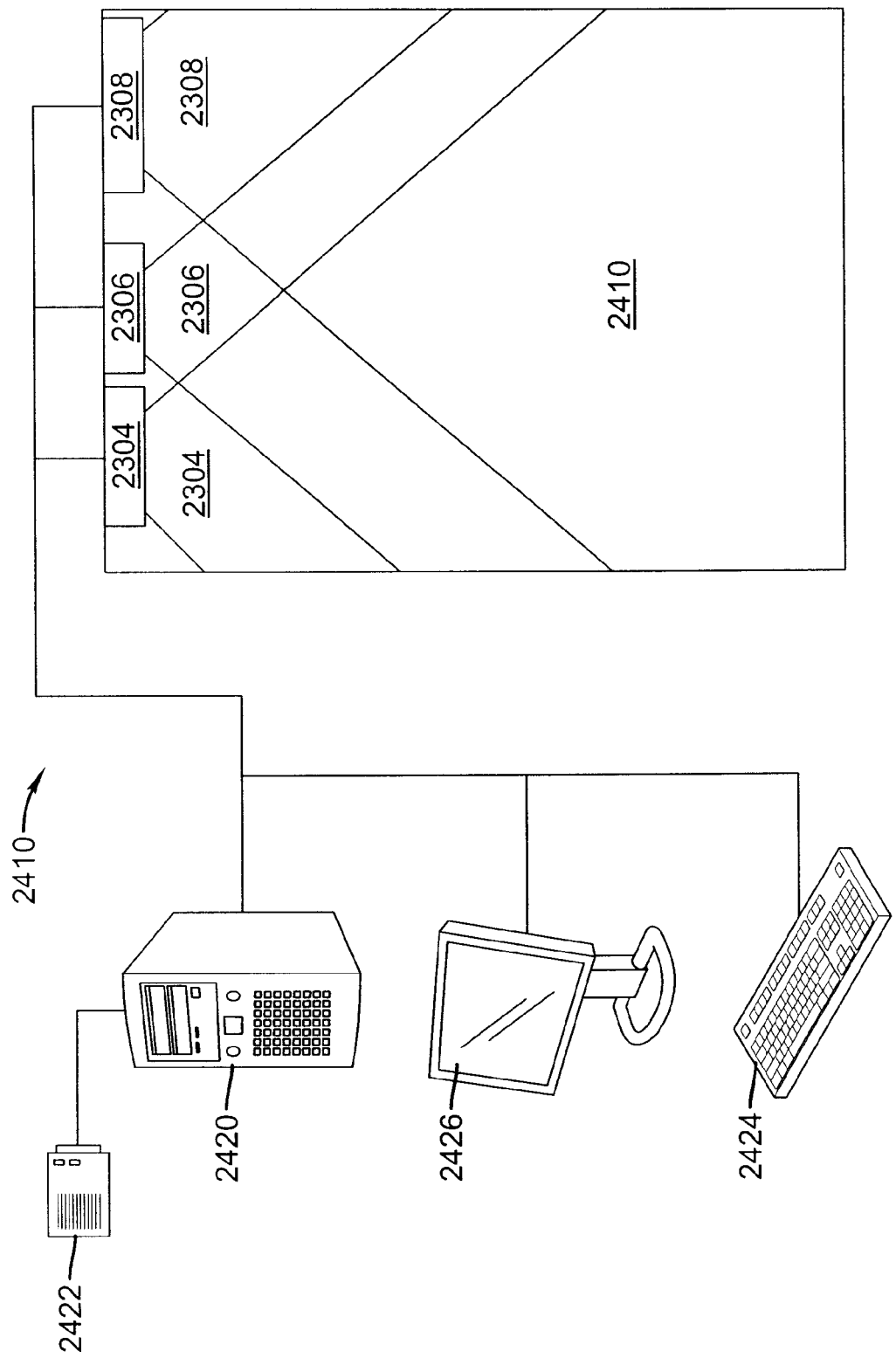
FIG. 24 shows a top down view of the arrangement of FIG. 23

FIG. 23 shows a perspective view of a room 2300 having an arrangement of DFMs therein comprising a first that are arranged as described above with reference to FIGS. 14 and 15. FIG. 24 shows a top down view of the arrangement of FIG. 23, similar to FIG. 15 above, but also illustrating system level components of a first embodiment of display system 2410 that makes use of DMFs 2304, second DMF 2306, and third DMF 2308.

As is illustrated in FIG. 24 the system 2410 incorporates three DFMs: first DMF 2304, second DMF 2306, and third DMF 2308, however this is done for simplicity and, in practice, a much larger number of DMFs can be used. As is also illustrated in FIG. 24 a controller 2420 is provided that is logically connected to first DMF 2304, second DMF 2306, and third DMF 2308 such that data can be exchanged therebetween. The method of such a logical connection can be made using any form of wired or wireless communication. As such a logical connection can be made between controller 2420 and first DMF 2304, second DMF 2306, and third DMF 2308 using any of the above described manners.

In one embodiment, controller 2420 can comprise a DFM server 720 as illustrated in FIG. 7 and that is logically connected to the DFMs in the same manner described therein. In another embodiment, controller 2420 can comprise a DMF network server ("DNS") 1059 of FIG. 10. In still other embodiments, controller 2420 can comprise any type of computing or processing system and a communication system (not shown) that enables a logical connection to be established with the DFMs. Finally, in yet another embodiment, the functions and methods described hereinafter as being performed by controller 2420 can be performed by one or more of processing circuits 220 or processing units 320 acting alone or in combination. Controller 2420 is also logically connected to a source of digital images 2422. The source of digital images can include any of digital still cameras, digital video cameras, scanners, computers, local servers, remote servers, memory devices, the internet, printers, internet appliances, a remote control, personal digital assistants, personal video players, telephones, telecommunication networks, cellular telephones, analog televisions or digital televisions or television signal distribution systems such as cable, satellite or other television systems and/or television storage systems such as recorders or players of television systems such as solid state, optical, or magnetic television signal recording and/or playback systems. The source of digital images 2422 can include an Internet connection or a direct connection to external existing databases such as stock photo databases or private databases. It is also foreseeable that public sites will develop for dissemination of such graphical and/or image materials.

In one embodiment, individual digital images can be located within such a source of digital images by use of a search function or engine. Where the source of digital images has digital images that are organized using a relational database indexed by a plurality of indices a search of such a database can be made by submitting keywords and a response to this search can comprise a listing of responsive digital image file names or an arrangement of thumbnails or other response.

It is understood by those skilled in the art that the source of digital images 2422 can use more sophisticated indexing strategies and that any database developed using such strategies can be used to locate and identify digital images for presentation. For example, the images may be indexed in multiple categories such as based on image content descriptions and inferences, rather than keywords. Where keywords may describe the circumstances surrounding the image, that is, the; who, what, where, when, and why parameters, content descriptors actually describe the data within the digital graphical material. Such factors, referred to as Image Content are obtained from the image itself and may include a color histogram, texture data, resolution, brightness, contrast, facial recognition, object recognition, text recognition, and so forth. In addition the content recording or utilization device itself produces another semantic element referred to as Camera Metadata and includes; Time/Date, GPS location data, Image orientation, Image size (resolution, format, compression), Capture setting (sports, portraits, macro, etc), Flash status (on/off/fill), Focus position, Zoom setting, Video sequence duration, Video encoding type, Video "key frame" designation, Video "still frame" designation, and so forth. By combining Image content data and camera Metadata from an image and/or event based perspective, establishing semantic relations between images and image objects can be accomplished. Using recorded metadata such as GPS location information, time/date of recording, and derived segment assignment such as eye/face recognition and object identification a semantic relationship can be established.

In addition to information gained at the camera level, image content and audio track, the marriage of information about the people in the pictures, the places, the event type and purpose is now being synthesized by learning computers in creating a semantic web of information. One such patent, U.S. Pat. No. 7,035,467 by Nicponski, teaches reading images for cakes, brides, children and thus inferring the event. Global, national, regional, local and personal dates of significance such as holidays, birthdays etc. With a zip code, a birth date, and access to a school calendar, trained systems can perhaps retrieve greater information than before regarding a son's first grade concert at school. Various patents such as, U.S. Pat. No. 5,652,880 suggest a framework for storing codified linkages between objects that can facilitate searching and retrieving semantic elements that are associated with content.

Figure 25:
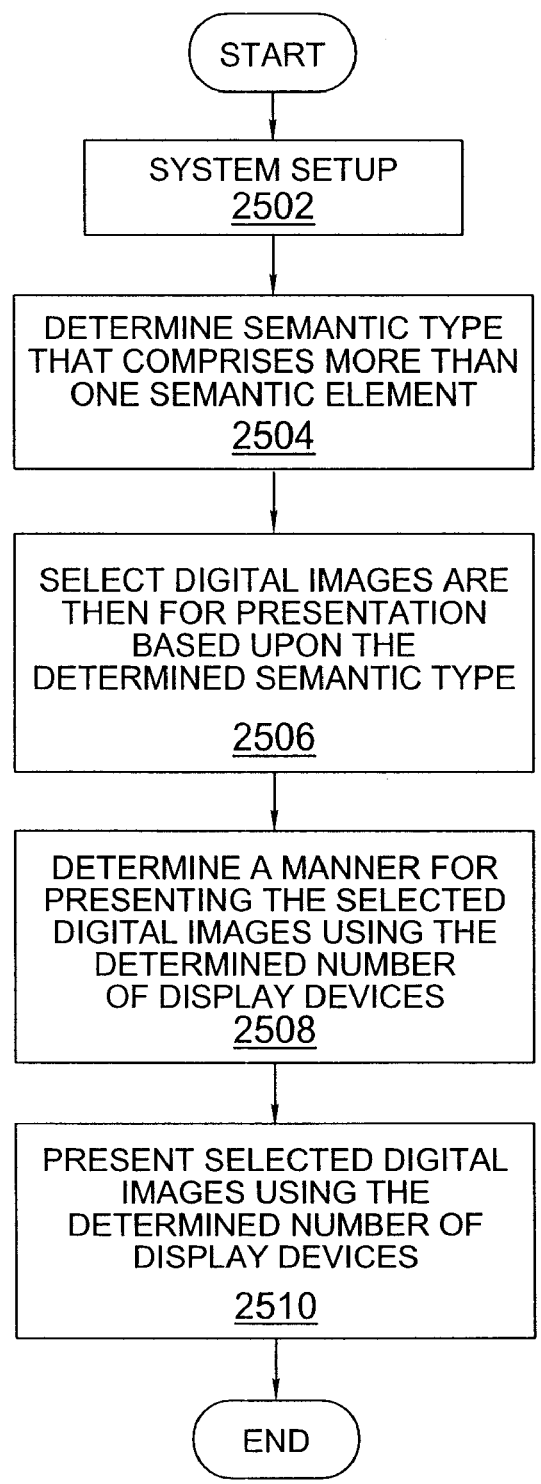
FIG. 25 shows a first embodiment of a method for operating the plurality of DMFs in system to present digital images.

FIG. 25 outlines one embodiment of a method for operating controller 2420. In step 2502, system controller has access to a source of digital images 2422. A user interface 2424 is provided to enable a user make a user input to controller 2420. User interface 2424 can include a remote control such as a hand held remote device, or wired or wireless keypad and mouse. A display 2426 is optionally provided to provide feedback to a user of system 2410 and/or to enable graphic user interfaces to be used to facilitate such user input and feedback. Display system 2410 can also comprise one or more of first DMFs 2304, second DMF 2306, and third DMF 2308.

In a first step of this method, a system setup function is performed (step 2502). In this step, the setup functions described above are executed to determine at least the number of DFMs that will present content into a display space and optionally to identify the relative position of each DFM. Additional setup functions such as those described above can also be performed including but not limited to determining characteristics of each including, but not limited to, display resolution, display color information, display refresh rates, processing unit information that identifies characteristics including but not limited to processing speed, multithreading, and multicore characteristics of the processing unit, memory characteristics such the overall capacity, type and speed of such memory, a memory map of data stored in the memory, and/or the nature of and the status of any data stored in such memory. Further, during setup a listing of capabilities of each DFM can be provided indicating the availability of certain types of memory, communication capabilities, processing capacity or programming or other capabilities. Other display characteristics for each DFM can also be provided during setup. Such other characteristics can include data an aspect ratio of a display of a DFM an orientation for a DFM A semantic type is then determined that comprises at least two semantic elements of a digital image to be presented (step 2504). This can be done manually by causing a user to use user interface 2424 and display 2426 to identify the semantic type for the images to be presented. In another embodiment, semantic type can be chosen automatically by controller 2420 based upon user profiles, preferences or other information.

The determined semantic type can be used by controller 2420 to enable automatic organization of the accessed digital images according semantic information. The term "semantic information" is used herein to refer to the meaning of a particular portion of data as interpreted by a human observer. Semantic information is determined based upon of one or more semantic elements. For example, semantic information refers to individual semantic elements such as the meaning of a word or phrase in a text document or the interpretation of a particular pattern of light and shadow in an image as a pair of eyes and also to semantic information that can be derived from combinations of semantic elements such as observing the text and the pair of eyes in the same image. The semantic type determination is used by controller 2420 to identify semantic information that is desired in the digital images to be presented and thus, has the effect of defining at least one semantic element to drive the search.

Semantic elements in turn can be determined by identifying context indicators in digital images and/or any metadata associated therewith. Various rules are used to identify context indicators in digital images and for conceptual clarity, rules that are used to identify context indicators can be organized into contextual frameworks of categories of related context indicators and associated rules for determining such context indicators. In a contextual framework, context indicators are particular items of semantic information that are identified by the associated rules as being relevant to the identified context. An individual contextual framework is, thus, inclusive of some of the semantic information potentially available in a digital image and exclusive of other semantic information potentially available. The general nature of the included semantic information can be indicated by the designated semantic element, which can be associated with a category of human contexts, as in the following examples.

One example of a contextual framework is a chronological contextual framework, that is, a framework of rules related to chronology that identify the chronological context of the set of digital images. For example, one rule can cause controller 2420 to analyze the digital images and any associated metadata to determine a range of dates and times over which the digital images were captured, another rule can examine each digital image and associated metadata to try to associate the set of content data files with a time of day, still another rule can cause controller 2420 to analyze the content data files to determine a time of day that a particular event occurred, and yet another can cause controller 2420 to determine the time of year in which the set of content data files were created. A chronological framework can also include rules that cause controller 2420 to determine whether the set of content data files represents a single event or a sequence of different events and/or for organizing the set of content data files into event groups. Methods for making such an event based clustering of content data files are well known. Such chronological indicators might be found in metadata associated with selected content data files, such as date and time information, or by way of analyzes of the content of the content data files for chronological indicators such as image, text or audio elements that are known to connote chronological happenings such as major holidays or events marking rites of passage such as birthdays and the like.

Analysis of digital images and metadata can also be used in combination with additional information provided by the rules of the contextual framework. For example, date information can be checked using rules that include a table of holidays and dates of global, regional or personal significance.

This same approach applies to other types of contextual framework.

Another example of a contextual framework is an environmental contextual framework that incorporates rules for locating environmental context indicators within the content data files. Such environmental context indicators generally describe rules for determining ambient conditions within which a narrative is told, for example, rules for determining weather conditions, daylight and indoor/outdoor status can be applied. Environment indicators, like chronological indicators, can be determined from metadata and analyses of content, and by use of additional outside information. For example, metadata on white balance can indicate indoor/outdoor status, exposure level can indicate light or dark outdoor conditions. Alternatively, time and date information, in combination with geopositioning information, such as data provided by the Global Positioning System (GPS) can be used in combination with rules that access an outside database of weather information to determine weather conditions at the time particular content was created.

Still other examples of a contextual framework include, but are not limited to a social framework that defines rules for location and social context indicators in the content data files such as groupings of people depicted therein. For example, family groupings, school groupings, work groupings and the like can be identified using appropriate rules.

Other contextual frameworks can be provided, for example, political and technological contextual frameworks can include, as context indicators, political figures or indicia of technological development, respectively. These context indicators can be selected by rules that access an outside database using other context indicators, such as: location, date, and the like.

Other types of contextual frameworks include: athletic, educational, and geographic. Contextual frameworks can combine or subdivide different types to meet particular needs. For example, an athletic and educational contextual framework can be provided. Likewise, an athletic contextual framework can be replaced by separate contextual frameworks for different sports. Contextual frameworks can be global, that is, usable by all users in all circumstances, or can be limited in application. For example, contextual frameworks can be provided that are specific to a particular author, subject, type or work of communication, manner of creation, or manner of use.

Contextual rules used in determining and prioritizing context indicators can be binary or probabilistic. For example, a single contextual rule or group of rules can be provided in the form of a Bayesian net. Contextual rules, and context indicators used in a particular contextual framework can be determined heuristically or by use of automated classification techniques, such as use of a genetic algorithm. Use of these techniques are well known to those of skill in the art.

Digital images are then selected for presentation based upon the determined semantic type (step 2506). This can be done by generating inference queries are then obtained by applying determined context indicators to a knowledge base for at least one person. Such a person can comprise, for example, the user, a person selected by the user or a person observed in a presentation space for system 2410. Further, for this purpose, such an associated person can also include, for example, any person, character depicted or other anthropomorphic representation contained within any digital image. There can be one or more than one associated person such as where two people are found in the presentation space. For convenience in explanation, the knowledge base is generally discussed herein in relation to a single person.

The knowledge base for the person can be stored in memory 226, 326 or on any memory that can be accessed by controller 2420. The knowledge base contains reference information about the relevant person that is accessed using the determined context indicators. The reference information comprises information, such as biographical information, about the relevant person including but not limited to educational information, professional information, social information and the like. The reference information is used in combination with context indicators to form inference queries that are used to locate digital images in the accessed digital image source having semantic information associated with the determined semantic type.

For example, the reference information can include educational history for a person. The educational history can identify schools attended by the relevant person and the years of attendance. If a context indicator suggests that the set of content data files were captured during a particular year and the knowledge database indicates that the associated person was attending a particular school during that year, then inference queries can be generated for content data files that are related to the school and/or people who attended the school during the relevant year.

In one embodiment, all of the selected digital images are provided for inclusion in the work of communication. However, this can result in the presentation of a very large number of digital images.

Alternatively, the digital imaged and/or associated metadata provided for inclusion can be limited in some manner. For example, digital image and/or associated metadata can be limited to a predetermined metric, such as number of digital image and/or associated metadata or total size or to those that have a priority greater than a minimum level of priority. The metric used can be determined heuristically and can vary depending upon factors, such as the contextual framework, the associated person, the subject, type or work of communication, manner of creation, and manner of use.

In one embodiment, only those digital images meeting a predetermined priority metric are selected from those selected automatically according to semantic type. Alternatively a user can identify particular images from the selected images for presentation.

The determination of significance is based upon the nature of the digital images found during the search and the relationship of the digital images the person. A higher priority is given to digital images depicting content having a greater level of immediacy for or closer relationship to the associated person. Thus, in the above described search for school related digital image, those digital images having content that depicts the present appearance of the school might be given lower priority than digital images that present subject matter from the years in which the person attended that school. Similarly, content data files actually depicting the relevant person at the time and at the school would be determined to be of still higher significance and thus given greater priority.

There are a number of means of measuring significance. Any system of significance measure can be used. The preceding discussion has been directed to a particular example of such a system, in which psychological significance is measured using such as Maslow's Hierarchy of needs as described in Abraham H. Maslow, Motivation and Personality (1954). The psychological significance can also be multiplied by intensity, ubiquity and duration to provide a product that will be referred to as the absolute significance. It should be noted that other forms of gauging significance (social, economic, historical, political and so on) may be equally or more appropriate depending on the needs of the user.

Controller 2420 then determines a manner for presenting the selected digital images using the determined number of display devices (step 2508) and presents the selected digital images using the determined manner (step 2510). Various methods for presentation are discussed in the following section.

Manners for Presenting Digital Images

In one embodiment, the controller 2420 can select a first manner for presenting the selected digital images can be made by evaluating characteristics of the DMFs and assigning digital images to particular DMFs based upon the image characteristics of the digital images. This first manner does not require knowledge of the positional arrangement of the displays.

Such characteristics can include frame aspect ratio, orientation, and size. These characteristics of the display can be identified during a set up process. For example, it is highly desirable to match the orientation of the display on a DMF and the orientation of the digital image. In another example, digital images containing video content may be presented using the DMF having a larger display or a display that has a refresh rate or more memory than are available in other DMFs. Remaining images are shown in the smaller frames.

Another embodiment for frame assignment may be based on image emphasis. U.S. Pat. No. 6,748,097 suggests higher magnification for superior quality images, and thus images of relevance, yet of lesser value would be displayed on the smaller frames. Such image quality can be determined generally using factors such as focus and lighting quality and composition measures as are known in the art. Additional characteristics of the manner of presentation may include how long each image is displayed, types and durations of the transitions, the play of one video at a time while the others are at a start frame, etc.

Semantic information can also be used as a basis for assigning digital images for presentation on DMFs having particular characteristics. Specifically, it will be appreciated that a determined semantic type can require the identification of digital images that are associated with a combination of a plurality of different types of semantic elements. In one embodiment, a larger or otherwise preferred display can be used to present digital images selected based upon the combination of all of the semantic elements while, non-preferred DMFs are used to present digital images that are found using subsets of the semantic elements of less than all of the combination of semantic elements associated with the semantic type.

In one example, a determined semantic type can include a family and an associated person can comprise a first parent. Accordingly, inference queries can be generated that seek digital images illustrating groupings of the family which might be obtained by analyzing digital images for a combination of four semantic elements comprising the first parent, a second parent, a first child and a second child. Digital images containing all four image semantic elements can be located and presented on a primary DMF. In this example, second DMF 2306 is determined to be the primary DMF based upon the relatively large display size of characteristics of second DMF 2306 as compared to first DMF 2304 and third DMF 2308 such as those described above, DMF 2304.

A first additional inference query can be generated for a first sub-combination of semantic elements depicting the first parent and either of the first child or second child in display. Digital images located by first additional inference query can be displayed either of first DMF 2304 which is larger than third DMF 2308. Digital images located by a second additional inference query for a second combination for semantic elements that indicating that any of the parents or children are in the digital images can be presented using third DMF 2308.

Where any semantic elements suggest that a subset of located digital images are related, controller 2420 can be adapted to cause the presentation of such a subset digital images in a manner that corresponds to the determined relationship. For example, images captured of a common event from different perspectives can be identified and presented in a manner that is consistent with the difference in perspective and in an order that is consistent with the occurrence of events.

In another example, a digital image might take the form of a video sequence that runs for 20 seconds. Accordingly, controller 2420 can cause the video type digital image to be presented on second DMF 2306 while presenting related still image type digital images on first DMF 2304 and third DMF 2506.

It will be appreciated that audio content or other non-image environmental stimulus that is related to certain digital images can be presented concurrently with the presentation of the related digital images using for example, audio system 1928 or the like.

In an embodiment where system controller 2420 has established the positions of first DMF, 2304, second DMF 2306 and third DMF 2308 it becomes possible to define spatial distributions of the that there is information as to where each frame is relative to the other frames images. Such possibilities can be used to help make the presentation of images more intuitively understandable.

Figure 26:
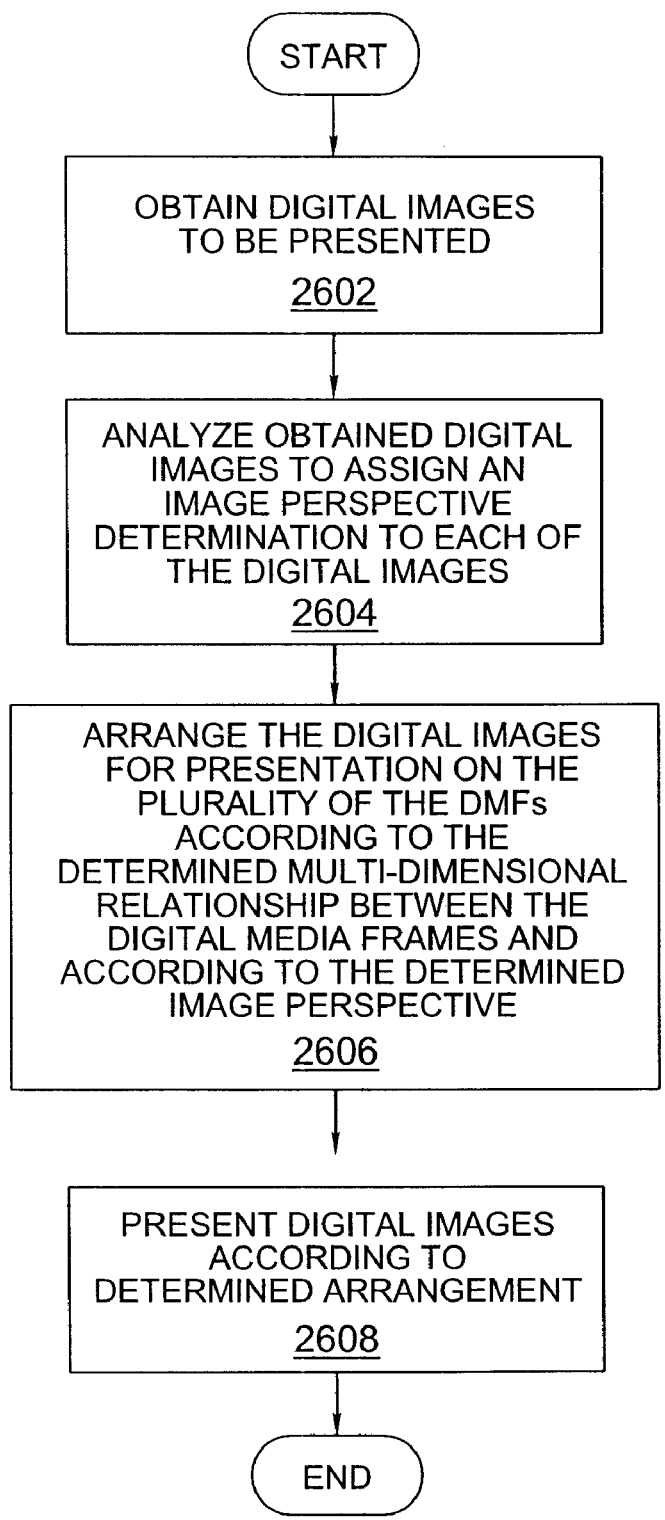

FIG. 26 illustrates one example of a method for presenting images using a plurality of displays separated spatially along at least two axes. As is illustrated in FIG. 26, the digital images to be presented are obtained (step 2602). Such digital images can be provided as a result of semantic or other type of search or they can be manually selected. The obtained digital images and any associated metadata are then analyzed to assign an image perspective determination to each of the digital images (step 2604). In the illustrated embodiment, the following rules can be considered when assigning an image perspective determination to the digital images.

Upper perspective images can include any digital images having the following discernable characteristics images captured at High Altitude locations, camera pointed up, azimuth angle, pictures of mountains, pictures with high percentage of sky, and people with eyes or head facing downward toward the capture device that captured the digital image.

Conversely, the lower perspective images can correspond to images taken at low altitude locations, pictures of boats or even under water pictures. Additional characteristics include camera pointing down azimuth angle, and people looking up.

Mid perspective images can be those that do not have the above described characteristics, or that exhibit characteristics indicate of level photography or perspective, such as equal displacements of sky and land, relatively flat azimuth information or location information suggesting that relatively level display images were captured.

It will be appreciated that an image can be designated according to this approach on the basis of metadata or semantic information.

An arrangement of the digital images for presentation on the plurality of the DMFs of such a system can be determined according to the determined multi-dimensional relationship between the digital media frames and according to the determined image perspective (step 2606). In one embodiment, this can be done, by directing digital images to the DMFs in a manner that is consistent with the perspective assignment, such as by directing high perspective images to upper frames, lower perspective images to lower DFMs and mid-perspective images to DFMs between the upper DFMs and lower DFMs. Middle frames and larger frames can also be earmarked for the best pictures or image emphasis pictures, images including the most people and video content if desired.

In addition, similar rules can be used to assign digital images with perspective assignments that indicate camera pointed left versus right (part of the GPS standard), people looking right. Here, however, it is more natural and intuitive for the right most perspective images to be presented on the left most frames as such positioning would correspond with people looking left, camera pointed right, etc.

In other embodiments, chronologically related data can be presented from a left to right can also make up time intervals. Time intervals include breaking up a chronology such as a child's age into the number of columns of frames. In an example where there are 5 columns of frames, the early fifth of the child's life to the first column of frames, the second fifth to the second column and so on. In addition, other elements can provide assignments to rows as well. One type of row assignment may include the example such as child number one in the first row, child number two in the second row and so on.

It will also be appreciated that the manner of presentation can be influenced by an overall amount of time allowed for the presentation and that presentation time for certain content can be adjusted automatically to crop, extend, accelerate, or segment the presentation of video type digital images in order to better fit an allotted time period for the presentation.

As noted above image transitions effects can be used to signal when the digital images on any DFM is changed. Images on the various frames can be transitioned using known transition effects and can be transitioned simultaneously with the images on two or more of the DFMs in the system presenting transition effects in a simultaneous manner, a synchronized manner, at various rates and/or sequentially to provide a desired effect.

Semantic information can also be used as a basis for assigning digital images for presentation on DMFs known positions. Specifically, it will be appreciated that a determined semantic type can require the identification of digital images that are associated with a combination of a plurality of different types of semantic elements. In one embodiment, a central or otherwise preferably located DFM can be used to present digital images selected based upon the combination of all of the semantic elements while, non-preferred DMFs are used to present digital images that are found using subsets of the semantic elements of less than all of the combination of semantic elements associated with the semantic type.

In one example, a determined semantic type can include a family and an associated person can comprise a first parent. Accordingly, inference queries can be generated that seek digital images illustrating groupings of the family which might be obtained by analyzing digital images for a combination of four semantic elements comprising the first parent, a second parent, a first child and a second child. Digital images containing all four image semantic elements can be located and presented on a primary DMF. In this example one of the DMFs is determined to be the primary DMF relatively central location as compared to other locations of other DMFs.

A first additional inference query can be generated for a first sub-combination of semantic elements depicting the first parent and either of the first child or second child in display. Digital images located by first additional inference query can be displayed using additional DMFs selected in accordance with their location relative to the primary DMF.

Where any semantic elements suggest that a subset of located digital images are related, controller 2420 can be adapted to cause the presentation of such a subset digital images in a manner that corresponds to the determined relationship. For example, images captured of a common event from different perspectives can be identified semantically and presented in a manner that is consistent with the difference in perspective and in an order that is consistent with the occurrence of events.

In still another example, a selection of a semantic type can involve defining a semantic filter for at least one of the DMFs to be used for presenting digital images. The semantic filter defining at least one semantic element; this can cause the at least one of the plurality of separate DMFs to be used to present content selected from the digital images according to the semantic filter selected for the at least one display device such that digital images having the at least one semantic element are presented.

Semantic information can also be used as a basis for assigning digital images for presentation on DMFs having known positions five paragraphs back.

When finished, the controller will repeat the presentation for a predetermined amount of cycles. In another embodiment, upon completion of n cycles, the system could enter a random mode, where semantic types are selected at random for presentation for another predetermined number of cycles at a time. In another embodiment, semantic types are selected within a 1-3 day buffer zone of significant dates to the family based on the profile. If an anniversary is about to occur, the semantic type that is system chosen could be pictures of husband and wife in the past year or number of years that they have been married. In addition digital images can be selected according to season such as by selecting certain semantic types according to season or other chronological factors.

The invention has been described in detail with particular reference to certain preferred embodiments thereof, but it will be understood that variations and modifications can be effected within the spirit and scope of the invention.

The invention claimed is:

1. A digital image presentation system comprising:
   a plurality of digital media frames each having a display surface and driving circuit capable of cooperating to present digital images, with the plurality of digital media frames arranged in a multi-dimensional spatial distribution so that each display surface forms images that are viewable from a presentation space;
   analyzing the digital images to assign an image perspective determination to each of the digital images;
   a control circuit adapted to use a sensing system determine a multi-dimensional distribution of the digital media frames and to obtain digital image data files from which the control circuit can generate signals causing the digital image to be presented on the plurality of digital media frames;
   wherein the control circuit determines an arrangement of the digital images for presentation on the plurality of the digital media frames according to the multi-dimensional relationship between the digital media frames and according to the determined image perspectives; and
   further comprising: an input system having at least one sensor that is adapted to sense at least one condition that is indicative of relative positions of each of the plurality of display wherein said control circuit is adapted to determine the multi-dimensional relationship between the digital media frames automatically.

2. The control system of claim 1, wherein said relational image content comprises a distribution of digital images on the distribution of digital media frames, the presentation of a type of according to at least one semantic element and the distribution of digital media frames.

3. A digital image display system comprising:
   a plurality of digital media frames arranged in a spatial distribution and presenting image content that is viewable in a viewing area;
   a control system for obtaining image content for presentation on the plurality of digital media frames, and for generating signals causing the obtained image content to be presented on the plurality of digital media frames;
   wherein said control system determines a vector path between digital media frames and uses the vector path to generate indications reflecting transitions of image data files to or from individual digital media frames within the system;
   a sensing system for providing data to the control system from which the control system can determine the vector path between the digital media frames and the controller; and wherein the vector path is used to generate indications reflecting remote control and data flow in the form of transitions on the display system, and where the indications reflect remote control and data flow in the form of transitions on the display system, and
   where a wave or ripple indication is orthogonal to the vector path between the remote control and the plurality of displays.

4. A method for presenting digital images using a plurality of digital media frames separated spatially along at least two axes viewable from a presentation space, the method comprising the steps of:
   obtaining the digital images to be presented;
   determining the multi-dimensional relationship between the digital media frames;
   analyzing the digital images and any associated metadata to assign an image perspective determination to each of the digital images;
   determining an arrangement of the digital images for presentation in the presentation space on the plurality of the digital media frames according to the multi-dimensional relationship between the digital media frames and according to the determined image perspectives; and
   further comprising: providing an input system having at least one sensor that is adapted to sense at least one condition that is indicative of relative positions of each of the plurality of display wherein said control circuit is adapted to determine the multi-dimensional relationship between the digital media frames automatically.

5. The method of claim 4, further comprising the step of determining the multi-dimensional relationship between the digital media frames.

6. The method of claim 4, further comprising the step of determining the multi-dimensional relationship between the digital media frames by sensing the positions of the digital media frames.

* * * * *